(12) United States Patent
Joesten et al.

(10) Patent No.: US 12,542,431 B2
(45) Date of Patent: Feb. 3, 2026

(54) HOUSING FOR A CABLE GUIDE

(71) Applicant: BIZLINK INDUSTRY GERMANY GMBH, Roth (DE)

(72) Inventors: Bernd Joesten, Laatzen (DE); Alexander Boehm, Oelde (DE)

(73) Assignee: BIZLINK INDUSTRY GERMANY GMBH, Roth (DE)

( * ) Notice: Subject to any disclaimer, the term of this patent is extended or adjusted under 35 U.S.C. 154(b) by 171 days.

(21) Appl. No.: 18/577,756

(22) PCT Filed: Jul. 18, 2022

(86) PCT No.: PCT/EP2022/069998
§ 371 (c)(1),
(2) Date: Jan. 9, 2024

(87) PCT Pub. No.: WO2023/285702
PCT Pub. Date: Jan. 19, 2023

(65) Prior Publication Data
US 2024/0322545 A1    Sep. 26, 2024

(30) Foreign Application Priority Data
Jul. 16, 2021   (DE) ..................... 10 2021 118 489.4

(51) Int. Cl.
*H02G 3/32* (2006.01)
*B25J 19/00* (2006.01)
(Continued)

(52) U.S. Cl.
CPC .......... *H02G 3/263* (2013.01); *B25J 19/0025* (2013.01); *G01B 7/02* (2013.01);
(Continued)

(58) Field of Classification Search
CPC ........ H02G 3/263; H02G 3/34; H02G 3/0468; H02G 3/0481; H02G 3/32; H02G 11/00;
(Continued)

(56) References Cited

U.S. PATENT DOCUMENTS 2,891,365 A * 6/1959 Heckel ................... B65B 63/02
                                                   53/526
3,883,929 A * 5/1975 Fortsch ..................... F16L 3/13
                                                   269/131
(Continued)

FOREIGN PATENT DOCUMENTS

DE            1094053 B      12/1960
DE      102004050168 A1       4/2006
(Continued)

OTHER PUBLICATIONS

EP 24 21 3174 Search Report Dated Jun. 6, 2025.

*Primary Examiner* — Timothy J Thompson
*Assistant Examiner* — Michael F Mcallister
(74) *Attorney, Agent, or Firm* — Tarolli, Sundheim, Covell & Tummino LLP

(57) ABSTRACT

A device for housing cable guides has a housing element with a plurality of shell elements adapted together to at least partially enclose a device interior having at least two device openings. The device further has at least one fastening element arranged on the housing element and configured to be detachably arranged on a fastening device. Each of the plurality of shell elements is arranged on at least one further shell element so as to be pivotable about a rotational axis.

15 Claims, 17 Drawing Sheets

(51) Int. Cl.
*G01B 7/02* (2006.01)
*G01B 11/02* (2006.01)
*G01D 5/14* (2006.01)
*H02G 3/00* (2006.01)
*H02G 3/04* (2006.01)
*H02G 3/34* (2006.01)

(52) U.S. Cl.
CPC ............ *G01B 11/02* (2013.01); *G01D 5/145* (2013.01); *H02G 3/0468* (2013.01); *H02G 3/0481* (2013.01); *H02G 3/32* (2013.01); *H02G 3/34* (2013.01)

(58) Field of Classification Search
CPC ........ B25J 19/0025; G01B 7/02; G01B 11/02; G01B 11/026; G01D 5/145
USPC ........................................................ 174/480
See application file for complete search history.

(56) References Cited

U.S. PATENT DOCUMENTS

| | | | |
|---|---|---|---|
| 4,179,774 A | 12/1979 | Bradbury | |
| 4,877,228 A * | 10/1989 | Ripert | H01R 43/28 |
| | | | 269/238 |
| 4,904,000 A | 2/1990 | Matsui | |
| 5,277,387 A * | 1/1994 | Lewis | H02G 3/26 |
| | | | 248/74.2 |
| 5,824,957 A | 10/1998 | Holshausen | |
| 7,210,658 B2 * | 5/2007 | Carrera | H01B 13/01209 |
| | | | 248/65 |
| 11,469,579 B2 | 10/2022 | Joesten | |
| 2007/0158504 A1 | 7/2007 | Burlot | |
| 2014/0033851 A1 | 2/2014 | Hermey et al. | |
| 2016/0336682 A1* | 11/2016 | Markefka | H02G 3/0691 |
| 2020/0180527 A1 | 6/2020 | Nishimura et al. | |
| 2020/0207291 A1 | 7/2020 | Iwahara et al. | |
| 2021/0001499 A1 | 1/2021 | Hitz | |
| 2022/0184822 A1 | 6/2022 | Hitz | |

FOREIGN PATENT DOCUMENTS

| | | |
|---|---|---|
| DE | 102012010000 A1 | 11/2013 |
| DE | 102019108152 A1 | 10/2020 |
| EP | 2060369 A1 | 5/2009 |
| EP | 3799237 A1 | 3/2021 |
| GB | 2389970 A | 12/2003 |
| WO | 2020102063 A1 | 5/2020 |

* cited by examiner

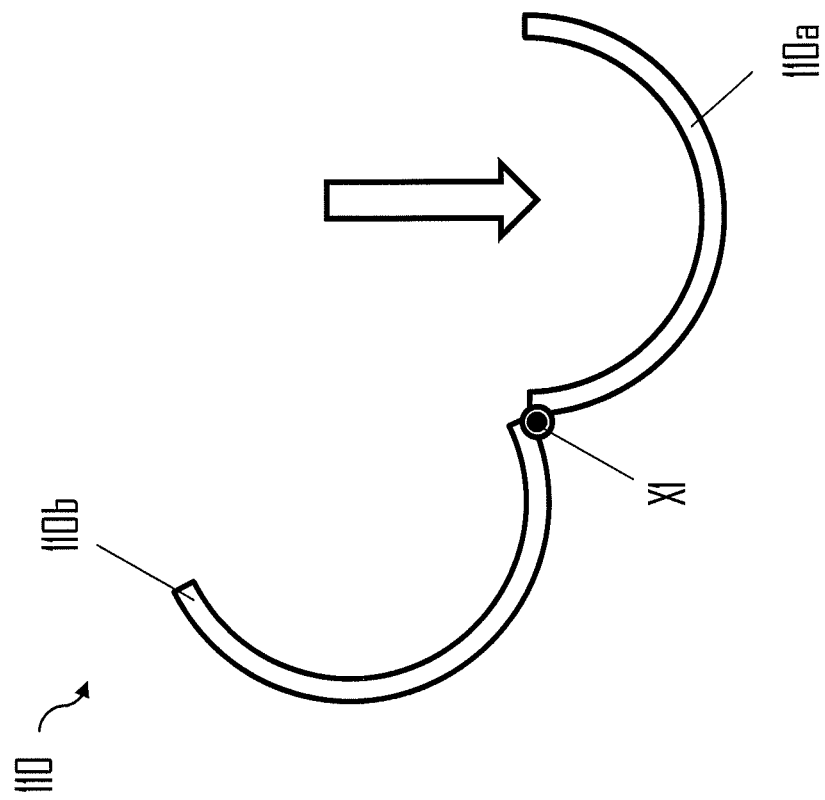
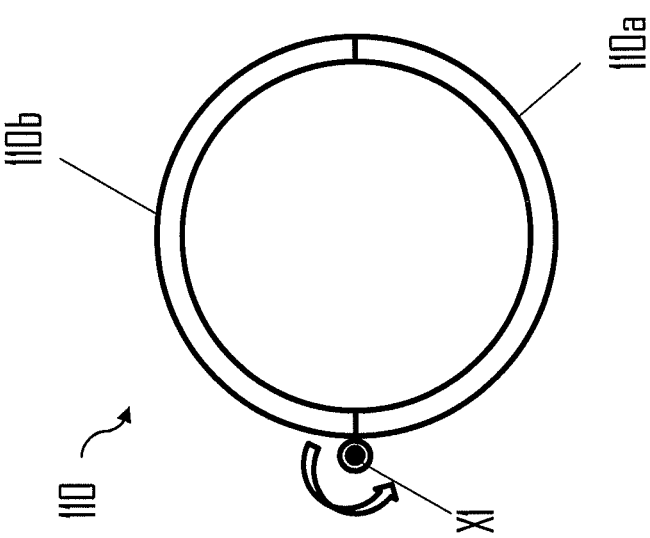
Fig. 2

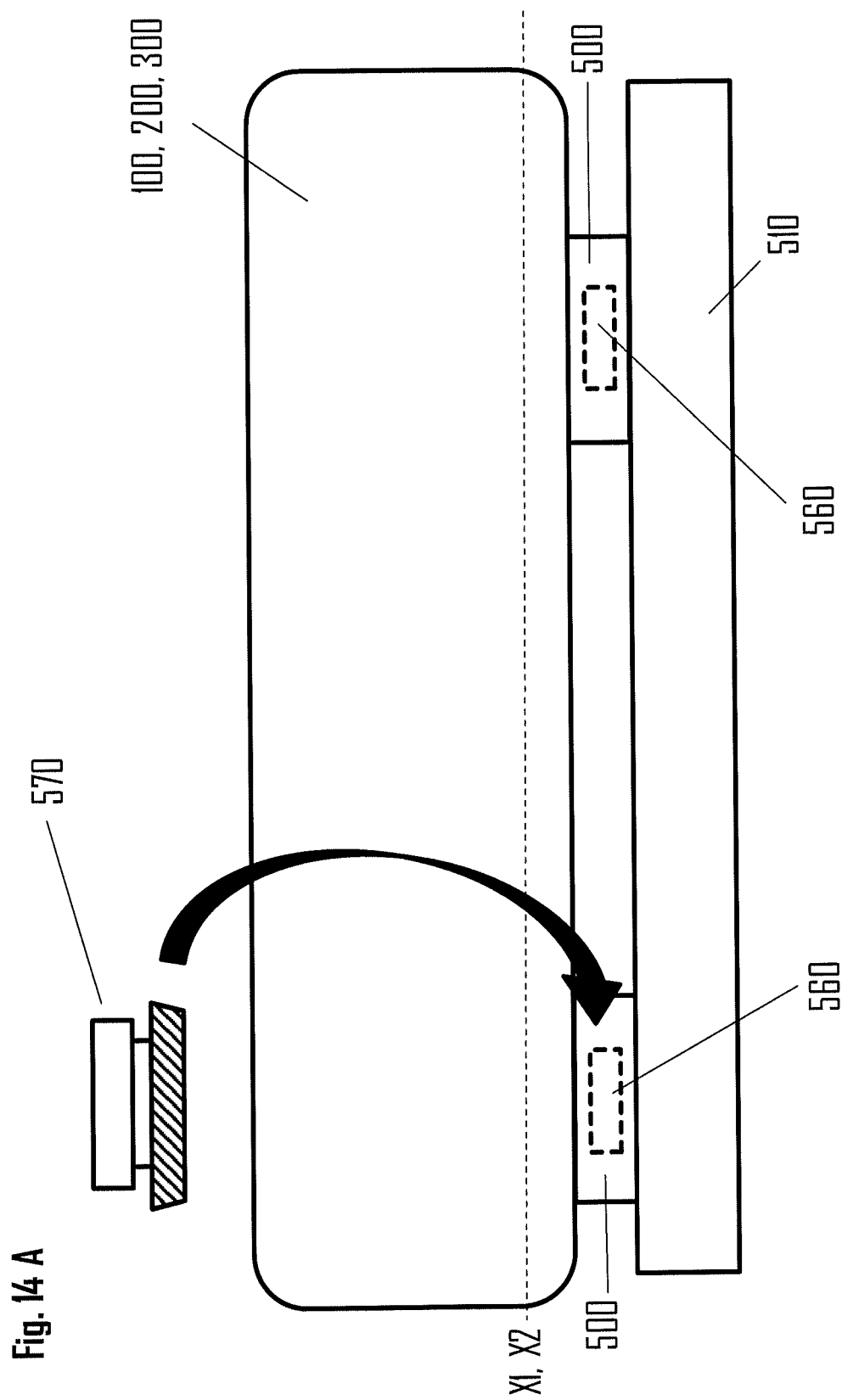

HOUSING FOR A CABLE GUIDE

RELATED APPLICATIONS

This application filed under 35 U.S.C § 371 is a national phase application of International Application Number PCT/EP2022/069998, filed Jul. 18, 2022, which claims the benefit of German Application No. 10 2021 118 489.4 filed Jul. 16, 2021, the subject matter of which are incorporated herein by reference in their entirety.

TECHNICAL FIELD

A housing device for a cable guide, also called a dress-pack in technical jargon, is described herein. Cable guides, for example corrugated hoses, also referred to as corrugated tubes, are used in particular in robotics and serve as supply lines or as bundling hoses for power, signal and pneumatic lines for supplying robots or parts of robots. In order to prevent movable robots or movable parts of robots from coming into undesirable contact with the cable guides and thus possibly damaging them, the cable guides are usually fastened to the robot by supporting devices or with the aid of a retract system, so that the cable guides, in particular the corrugated hoses, remain arranged at least substantially along designated cableways even while the robot is in operation.

BACKGROUND

Known housing devices for cable guides, in particular corrugated hoses, comprise a housing element in the form of a tube or half-tube, through which the cable guides or corrugated hoses to be fastened are guided or in which the cable guides or corrugated hoses to be fastened are arranged. The housing devices are fixed to a robot or in the environment thereof at different positions, for example, by a screw connection or adhesive connection, for example. The number of housing devices is governed by the number of cable guide or corrugated hose fixings that is required for line management and can therefore be varied. Furthermore, robots or other machines which have pre-prepared housing devices for cable guides, in particular for corrugated hoses, are also known.

Examples of known cable guides are disclosed by documents DE 10 2019 204 618 B4 and DE 10 2018 204 184 A1.

However, these known housing devices have a number of disadvantages. Firstly, the housing devices are often difficult to access for installation or arrangement of the cable guides or corrugated hoses. In particular, it can be time-consuming and impractical in practice to guide the cable guides or corrugated hoses completely through a housing element in the form of a tube, for example on installation of a robot, for example in the case of the subsequent arrangement of an additional housing device or in the event of a possible failure or of wear of existing housing devices on a robot or on another machine.

Furthermore, open, non-tubular housing devices for cable guides or corrugated hoses are, on the one hand, accessible only from a particular side, which makes the arrangement more difficult and additionally offers less protection for the housed cable guides or corrugated hoses, for example from damage as a result of contact with movable parts of a robot.

A further disadvantage of known housing devices is that the cable guides or corrugated hoses are at least partially pulled out of and/or through the housing devices, for example by a movement of robot components on which the housing devices are arranged and/or by a movement of robot components on which the actual cable guides or corrugated hoses are arranged. This movability of the housed cable guides or corrugated hoses relative to the housing elements is wholly intentional, because movable robotic arms, on which the cable guides or corrugated hoses are arranged, always also require a certain movability or play of the components, for example the corrugated hoses, arranged thereon. Nevertheless, it is a disadvantage that the cable guides or corrugated hoses can be at least partially pulled out of and/or through the housing devices by tensile forces acting on them, but are not moved in the opposite direction again by pushing forces acting in the opposite direction, because the cable guides or corrugated hoses resiliently absorb the pushing forces or deform or coil up outside the housing device owing to the pushing forces. Parts of the cable guides or corrugated hoses can thus be exposed to a considerable and permanently acting tension force, which shortens the service life of the cable guides or corrugated hoses. In addition, it is a disadvantage that it has hitherto not been possible, at least not without manual checking using external sensors, to measure or detect a load and/or movement of the cable guides or corrugated hoses. This makes it more difficult to identify non-optimally arranged housing devices or an at least non-optimally constructed hose guide.

It is a further disadvantage that the housing devices can be arranged on the robots and/or on other devices only inflexibly and only with the aid of a suitable tool, wherein in some cases it is also necessary, but not always practicable, to introduce drilled holes into a robot surface. A quicker, simpler and more flexible installation option for the housing devices is therefore desirable.

Accordingly, the technical object is to provide an improved housing device for cable guides, for example for corrugated hoses, which overcomes at least some of the disadvantages described hereinbefore.

SUMMARY

A device for housing cable guides or corrugated hoses has a housing element having a plurality of shell elements which are adapted together to at least partially enclose or shape a device interior having at least two device openings. Each of the plurality of shell elements is arranged on and/or fastened to at least one further of the plurality of shell elements so as to be pivotable about a rotational axis. The device further has at least one fastening element which is arranged on the housing element and is configured to be detachably arranged on and/or fastened to a fastening device.

In other words, the shell elements can each be pivotably and/or rotatably arranged on one another. The shell elements can be arranged on one another in particular in an interlocking manner and/or so as to be flush with one another. An advantage here is that, by pivoting or folding out one or more shell elements, the interior of the housing element can be freed for the arrangement of cable guides or corrugated hoses and, by subsequently folding in the shell element(s), the interior can be closed again, apart from the at least two device openings. The advantages of a tubular housing, namely better protection of the housed cable guides or corrugated hoses from damage and better fixing or arrangement of the cable guides or corrugated hoses in all spatial directions, are thus combined with the advantages of a non-tubular cable guide or corrugated hose housing, namely the possibility of arranging the cable guides or corrugated hoses in the housing device without having to guide them through the housing device from the hose end, for example.

In a variant, the device has a housing element having at least three shell elements, wherein each of the three shell elements is arranged on one of the further shell elements so as to be pivotable/hinged or rotatable about a rotational axis. An advantage here is that the interior of the housing element can be opened further than is possible, for example, with two shell elements which are pivotable relative to one another. When two shell elements are used, a substantially cylindrical interior can be rendered accessible only to the extent that at least one of the shell elements shapes at least a half-cylinder on the base area of a semicircle. This means that a cable guide or corrugated hose must be arranged in the interior of the housing element substantially orthogonally to the arrangement opening formed by the pivoting of the shell elements, which limits the arrangement options and/or the arrangement flexibility of the device. However, when three or more shell elements which are pivotable relative to one another are used, the interior of the housing element can be freed with virtually any desired opening angle, for example with an opening angle of 270°, which allows a cable guide or corrugated hose to be arranged from at least virtually any desired direction. This is an advantage in the case of the arrangement of cable guides or corrugated hoses on robots or on other machines, because in practice the housing devices or dresspacks are not freely accessible to an installer, for example, from any spatial direction.

The device can further have at least one closing device which is arranged on one shell element or on a plurality of shell elements and is configured to detachably fasten at least two of the plurality of shell elements to one another. The closing device can in particular have at least one locking element which is displaceable and/or movable in a direction parallel to the rotational axis/axes and which is adapted to produce and/or release the detachable fastening.

The closing device can have, for example, one or more closure bars which are each arranged on one of the pivotable shell elements. The closure bars can be configured to be brought into engagement, optionally at least partially material-based engagement, with or arranged on a formation and/or a further closure bar on a further shell element. The locking element can in particular be configured to fix or to release for detachment an optionally at least partially material-based and/or interlocking contact of the closure bar(s) with one another and/or with the further shell element.

The at least one closure bar can have at least in some portions an at least partially T-shaped cross section. Optionally, the closure bar can be adapted to be brought into contact, in particular by interlocking engagement, at least in some portions with part of a further shell element, and/or to form together with the part of the further shell element at least in some portions an at least partially T-shaped cross section. The locking element can be adapted to be brought into contact, in particular by material-based and/or interlocking engagement, at least in some portions with the closure bar, for example by a user of the device.

The closure bar and/or one of the shell elements can have one or more latching projections which are adapted to detachably fix the displaceable locking element in a predetermined position and/or to provide pressure resistance against a displacement or movement of the locking element in a direction parallel to the rotational axis/axes.

In a variant, the latching projections can be adapted to detachably fix the displaceable locking element in three different predetermined positions and/or to provide pressure resistance against a displacement or movement of the locking element in a direction parallel to the rotational axis/axes, for example when the locking element is moved out of one of the three predetermined positions.

The locking element can optionally have handling grooves, in particular running in a direction substantially orthogonal to the rotational axis/axes. The handling grooves can make it easier for a user of the device to operate the locking element.

In a variant, the locking element can further be adapted to be brought into interlocking contact with a central element, in particular when the closing device detachably fastens at least two of the plurality of shell elements together. In other words, the locking element can be moved by a user of the device into a position in which it on the one hand lies against a central element of the closing device and on the other hand detachably fastens together two of the plurality of shell elements.

The locking element and/or a counter-member arranged on a shell element can be configured to mutually fix one another in a predetermined position, in particular in a locking position.

An advantage of the closing device is that it allows the interior of the housing element to be opened or freed and also closed, shaped or shut without an additional tool, that is to say tool-free. This simplifies and accelerates the arrangement of a cable guide or corrugated hose in the device.

Optionally, one or more of the shell elements can have, in particular at a device opening, a guide geometry which is formed into the interior. The guide geometry can be adapted to define and/or to influence and/or to maintain a positioning of a cable guide or corrugated hose. In particular a specific intended arrangement of the cable guide or corrugated hose in the interior of the device can thus be ensured and/or improved.

In a variant, the device can have at least one length compensating element arranged in the device interior and having at least one spring. The at least one spring can be fixed to or arranged, in particular non-resiliently, on one of the shell elements and/or a guide geometry and can have a cable guide or corrugated hose housing, wherein the cable guide or corrugated hose housing is adapted to be fixed to or arranged, in particular non-resiliently, on a cable guide or corrugated hose. The length compensating element and/or the at least one spring can be adapted to shape or to surround a cable guide housed in the device interior of the device, in particular a housed corrugated hose. In other words, a cable guide, in particular a corrugated hose, can be guided through the spring or through a spring interior shaped by the spring.

The spring can be a metal spring, in particular a steel spring. The spring can be fixed to or arranged, in particularly non-resiliently, on one of the shell elements and/or a guide geometry in particular with a first spring end. Optionally, the spring can be arranged by one or more spring arrangement elements on one or more shell elements. The cable guide or corrugated hose housing can in particular be fixed to or arranged, in particular non-resiliently, at a second spring end. Optionally, the cable guide or corrugated hose housing can have a housing ring which is adapted to house or fix a cable guide, in particular a corrugated hose or corrugated hose portion, by material- and/or force-based engagement. In other words, the cable guide or the corrugated hose can be fastened substantially non-resiliently to the spring.

The length compensating element having the spring can in particular be adapted to house a cable guide, in particular a corrugated hose, fixed to or arranged on the cable guide or corrugated hose housing, with a material tension in a direction parallel to the rotational axis/axes.

Optionally, the spring can compress and/or squeeze the cable guide or corrugated hose fastened thereto to a predetermined degree at least in some portions, so that the cable guide or the hose can expand and/or be stretched (out) at least to a predetermined degree when a tensile force is exerted thereon, wherein, conversely, the spring fastened to the cable guide or to the corrugated hose is tensioned by the tensile force. If the tensile force exerted on the cable guide or on the corrugated hose diminishes, the tensile force acting on the spring also diminishes. In this case, the spring again compresses or squeezes the cable guide or the corrugated hose to a predetermined degree.

Furthermore, the spring can optionally be arranged in the device interior with a pre-tension or material tension, in particular in precompressed form, so that the spring, for example, exerts a force, in particular a counter-pressure, on the housed cable guide, in particular on a housed corrugated hose, even without a tensile force being exerted on a cable guide housed by the device, in particular on a corrugated hose.

An advantage of the length compensating element arranged in the device interior and having the spring is that, although a cable guide or a corrugated hose can be moved temporarily in the case of a robot movement, in particular can also be moved partially out of the device for housing cable guides or corrugated hoses, in order to compensate for the movement of the robot, it is moved back into the original arrangement position again by the spring when the robot movement is complete and/or when the robot has returned to the starting position. The cable housing or the corrugated hose is thus housed with a certain play, in particular with a certain play in the cable housing or hose direction, wherein an unwanted permanent movement of the cable housing or of the corrugated hose out of the device and/or (over) stretching of the cable housing or of the corrugated hose can be prevented.

In further embodiments, the device can also have a plurality of springs, in particular two springs, wherein each of the plurality of springs can be fixed to or arranged, in particular non-resiliently, on one of the shell elements and/or a guide geometry, and/or can each have a cable guide or corrugated hose housing.

Alternatively or in addition, the length compensating element can also have instead of the spring or springs a different resilient element, for example a rubber band, or also an electromagnetic system and/or a motor system, each of which, like the spring(s) described hereinbefore, is fastened and/or can be fastened to one of the shell elements or a guide geometry and to a cable guide, in particular to a corrugated hose. The resilient element or the electromagnetic system and/or the motor system can assume and/or replace the functions of the spring(s) described hereinbefore. Furthermore, the resilient element or the electromagnetic system and/or the motor system can have corresponding features to the springs described hereinbefore, in particular a cable guide or corrugated hose housing, which correspond in terms of function and/or form to the elements of the length compensating element which have been described hereinbefore.

In one embodiment, one, a plurality and/or all of the shell elements can have, in particular on an outer side of the shell elements, an in particular impressed indentation, guide, bead or groove. The shell elements, in particular the outer side of the shell elements, can have a manufacturing material with plastics material, in particular with polymer material, metal, carbon fibres, carbon fibre composite, ceramics and/or glass material.

An advantage of the in particular impressed guides, indentations, beads or grooves is that they can stiffen the shell elements and/or can improve the grip of the shell elements.

Furthermore, the shell elements can in particular be adapted to lie with an inner side opposite the outer side against a cable housing housed by the housing element, in particular against a corrugated hose, and/or against the length compensating element. A guide for the housed cable housing and/or the length compensating element can thus be produced, which in particular facilitates and/or improves a correct arrangement of the cable housing or of the corrugated hose in the device interior and defines or establishes a movement path for the spring of the length compensating element, in particular in the form of guide rails. The movement of the spring with the cable guide or corrugated hose housing can thus take place without substantial radial play, which on the one hand contributes towards protecting the material of the spring and facilitates compression or extension of the spring. Buckling of the spring can further be prevented. The shell elements can lie against and/or be brought into contact with a cable guide housed by the housing element, in particular against/with a corrugated hose, and/or against/with the length compensating element in particular with those regions of the inner side that are located opposite an in particular impressed indentation, guide, bead or groove in the outer side of the shell elements.

Optionally, at least one rotation element, for example a metal pin or a plastics pin, about which at least two of the shell elements are mounted so as to be pivotable about a rotational axis, can be enclosed completely by the two shell elements that are pivotably mounted about the rotation element. In other words, at least two shell elements can be pivotably or rotatably mounted by a rotation element, in particular a cylindrical rotation element, wherein one of the shell elements or both shell elements in conjunction form a casing for the rotation element which surrounds the rotation element at least partially, for example completely.

An advantage here is that the rotation element can be protected from the ingress of dirt into the bearing and from the ingress of liquids into the bearing, and a lubricant of the rotation element can remain in the casing formed by the shell elements. Furthermore, handling of the device is facilitated in that a user of the device cannot accidentally come into contact with a lubricant of the rotation element or bearing. In addition, the casing formed by the shell elements protects the rotation element from damage.

The device interior enclosed by the shell elements can have an at least substantially cylindrical portion which is configured to house the length compensating element and/or a guide geometry and/or at least part of a cable guide, in particular of a corrugated hose. The device interior can, for example, have an at least substantially cylindrical portion which is adapted to house corrugated hoses having a diameter of, for example, approximately 70 mm, 56 mm or 48 mm. The at least two device openings, which can always be maintained even after pivoting, rotation, folding in or closing of the shell elements and in particular are suitable for the passage of a cable guide, in particular a corrugated hose, which is to be housed by the device, can in particular be openings of an at least substantially cylindrical portion of the device interior.

Furthermore, the device interior enclosed by the shell elements can have an at least substantially cuboidal portion which is adapted in particular to house one or more sensor elements. The at least one substantially cuboidal portion of the device interior can be enclosed at least partially by one shell element and/or at least partially by a plurality of shell elements. An advantage of the at least one substantially cuboidal portion of the device interior is that this portion of the device interior is highly suitable in particular for the arrangement of additional device elements, in particular of sensor elements, and that the device elements so arranged in the device interior are likewise protected by the shell elements from contamination and damage.

For example, the device can have at least one sensor element which is adapted to detect a spring elongation or spring deflection of the spring of the length compensating element, wherein the at least one sensor element can be, for example, an optically detecting sensor element. Alternatively, the sensor element can also be a non-optically detecting sensor element, for example a tensile force sensor or a spring sensor or a capacitive sensor. In a variant, the sensor element can also be a magnetically detecting sensor element, for example a Hall-effect sensor.

In one embodiment, the fastening element of the device can be adapted to be arranged or to have been arranged on the fastening device by a screw connection. In other words, the fastening element can be capable of being arranged on the fastening device. Alternatively or in addition, the fastening element can have a toothing and can be adapted to engage by means of the toothing in an interlocking manner into a corresponding (counter-)toothing of the fastening device. The toothing of the fastening element and/or the toothing of the fastening device can each be adapted to permit a plurality of possible arrangement positions of the fastening element on the fastening device. In other words, the toothing of the fastening element and/or the toothing of the fastening device can be adapted not to define an arrangement position of the fastening element on the fastening device. The arrangement position of the fastening element on the fastening device can be variable or changeable.

Optionally, the fastening element can be adapted to be detachably fastened to the fastening device by one or more fastening bolts and/or by one or more fastening clips. The fastening bolt(s) and/or the fastening clip(s) can each engage both into prepared openings in the fastening element and into prepared openings in the fastening device. Furthermore, the fastening bolts and/or the fastening clips can each be capable of being inserted into the prepared openings in the fastening element and into the prepared openings in the fastening device in particular in a direction parallel to the rotational axis/axes or in a direction orthogonal to the rotational axis/axes. An advantage here is that the fastening element can be connected to the fastening device and/or also detached therefrom again without an additional and/or special tool. Installation of the device for housing cable guides or corrugated hoses can thus be simplified and accelerated.

The toothing of the fastening element can be arranged on a surface of the fastening element. Alternatively or in addition, the toothing of the fastening element can also be arranged on a locking prolongation of the fastening element.

The locking prolongation can be arranged on a further component of the fastening element, for example on a fastening element base body, so as to be pivotable about a fastening element axis. The fastening element axis can be arranged in particular parallel to the rotational axis/axes of the shell elements.

The toothing arranged on the locking prolongation can be adapted to be brought into interlocking engagement at least partially with the toothing of the fastening device by pivoting of the locking prolongation about the fastening element axis. Furthermore, the toothing arranged on the locking prolongation can be adapted to be detached at least partially from the toothing of the fastening device by pivoting of the locking prolongation about the fastening element axis.

An advantage of the pivotable locking element having a toothing is that a surface of the fastening element can also be formed without a toothing, which allows the fastening element to slide or be pushed over the toothing of a fastening device. The fastening element can thus first be pushed or moved over the toothing of a fastening device in a direction parallel to the fastening element axis and, once a desired position in a direction parallel to the fastening element axis has been reached, can be fixed to the fastening device by means of the pivotable locking element. Fixing of the fastening element to the fastening device can be achieved by bringing a toothing arranged on the locking prolongation into interlocking engagement at least partially with the toothing of the fastening device by pivoting the locking prolongation about the fastening element axis.

Optionally, the locking prolongation can have at least one, in particular resiliently deformable, locking prolongation latching element which is adapted to fix the locking prolongation to the housing element and/or to one of the shell elements of the housing element and/or to the fastening device when the toothing arranged on the locking prolongation is brought into engagement with the toothing of the fastening device.

An advantage of the in particular resiliently deformable locking prolongation latching element is that unintentional detachment of the locking prolongation from the housing element and/or from the fastening device can thus be prevented. Optionally, the locking prolongation having the locking prolongation latching element can be adapted to be detached from the housing element and/or from one of the shell elements of the housing element and/or from the fastening device again against a pressure resistance, so that the fixing effected by the locking prolongation latching element is reversed. Optionally, a device for housing cable guides or corrugated hoses can have one or more sealing elements which are each arranged at and/or in one of the device openings and/or are adapted to lie against an at least partially housed cable guide, for example against a corrugated hose having a diameter of, for example, approximately 70 mm, 56 mm or 48 mm. The sealing elements can each be adapted to close one of the device openings in an at least substantially dust- and/or liquid-tight manner in conjunction with the housed cable guide or with the housed corrugated hose. Contamination of the device interior can thus be prevented.

A further device for housing cable guides or corrugated hoses has a housing element having at least one shell element which at least partially encloses or shapes a device interior having at least two device openings. At least one fastening element is arranged on this housing element and is configured to be detachably arranged on or fastened to a fastening device. The device further comprises at least one length compensating element arranged in the device interior and having a spring which is fixed to or arranged on the shell element and has a cable guide or corrugated hose housing, wherein the cable guide or corrugated hose housing is adapted to be fixed to or arranged on a cable guide or a corrugated hose. In addition, the device has at least a first sensor element arranged in the device interior and adapted to detect a change in the length compensating element and/or a spring elongation or spring deflection of the spring of the length compensating element.

The spring is fixed to or arranged, in particular non-resiliently, on one of the shell elements and/or a guide geometry of a shell element and has a cable guide or corrugated hose housing, wherein the cable guide or corrugated hose housing is adapted to be fixed to or arranged, in particular non-resiliently, on a cable guide or corrugated hose. The length compensating element and/or the spring can be adapted to shape or to surround a cable guide, in particular a corrugated hose, housed in the device interior of the device. In other words, a cable guide or a corrugated hose can be guided through the spring or through a spring interior shaped by the spring.

The spring can be a metal spring, in particular a steel spring. The spring can be fixed to or arranged, in particular non-resiliently, on one of the shell elements and/or a guide geometry of a shell element, in particular with a first spring end. Optionally, the spring can be arranged by one or more spring arrangement elements on one shell element or on a plurality of shell elements and/or on a guide geometry of a shell element. The cable guide or corrugated hose housing can in particular be fixed to or arranged, in particular non-resiliently, at a second spring end. Optionally, the cable guide or corrugated hose housing can have a housing ring which is adapted to house or fix a cable guide, for example a corrugated hose or corrugated hose portion, by material and/or force-based engagement. In other words, the cable guide or the corrugated hose can be fastened substantially non-resiliently to the spring.

The length compensating element having the spring can in particular be adapted to house a cable guide, in particular a corrugated hose, fixed to or arranged on the cable guide or corrugated hose housing, with a material tension in a direction parallel to the rotational axis/axes.

Optionally, the spring can compress and/or squeeze the cable guide or corrugated hose fastened thereto to a predetermined degree at least in some portions, so that the hose can expand and/or be stretched (out) at least to a predetermined degree when a tensile force is exerted thereon, wherein, conversely, the spring fastened to the cable guide or to the corrugated hose is tensioned by the tensile force. If the tensile force exerted on the cable guide or on the corrugated hose diminishes, the tensile force acting on the spring also diminishes. In this case, the spring again compresses or squeezes the cable guide or the corrugated hose to a predetermined degree.

Furthermore, the spring can optionally be arranged in the device interior with a pre-tension or material tension, in particular in precompressed form, so that the spring, for example, exerts a force, in particular a counter-pressure, on the housed cable guide or on the housed corrugated hose even without a tensile force being exerted on a cable guide housed by the device, in particular without a tensile force being exerted on a corrugated hose housed by the device.

An advantage of the length compensating element arranged in the device interior and having the spring is that, although a cable guide, for example a corrugated hose, can temporarily be moved in the case of a robot movement, in particular can also be moved partially out of the device for housing cable guides or corrugated hoses, in order to compensate for the movement of the robot, it is moved back into the original arrangement position again by the spring when the robot movement is complete and/or when the robot has returned to the starting position. The cable housing or the corrugated hose is thus housed with a certain play, in particular with a certain play in the housing direction or hose direction, wherein an unwanted permanent movement of the cable guide or of the corrugated hose out of the device and/or (over)stretching of the cable guide or of the corrugated hose can be prevented.

In further embodiments, the device can also have a plurality of springs, in particular two springs, wherein each of these plurality of springs can be fixed to or arranged, in particular non-resiliently, on one of the shell elements and/or a guide geometry of a sleeve element, and/or can each have a cable guide or corrugated hose housing.

Alternatively or in addition, the length compensating element can also have instead of the spring or springs a different resilient element, for example a rubber band, or also an electromagnetic system and/or a motor system, each of which, like the spring(s) described hereinbefore, is fastened and/or can be fastened to one of the shell elements and/or to a guide geometry of a shell element and to a cable guide, in particular to a corrugated hose. The resilient element, the electromagnetic system and/or the motor system can assume and/or replace the functions of the spring(s) described hereinbefore. Furthermore, the resilient element, the electromagnetic system and/or the motor system can have corresponding features to the springs described hereinbefore, in particular a cable guide or corrugated hose housing, which correspond in terms of function and/or form to the elements of the length compensating element which have been described hereinbefore.

The at least one sensor element can be, for example, an optically detecting sensor element. Alternatively, the sensor element can also be a non-optically detecting sensor element, for example a tensile force sensor or a spring sensor or a capacitive sensor. In a variant, the sensor element can also be a magnetically detecting sensor element, for example a Hall-effect sensor.

An advantage of the device having the sensor element arranged in the device interior is that a load and/or movement of the cable guide or of the corrugated hoses can be measured or detected without manual checking using external sensors. The measurement or detection results of the sensor element can be transmitted, for example by a radio link, to an evaluation device, for example to a computing unit. The evaluation device can evaluate and/or process the measurement results, store and/or compare them for a prolonged period of time and/or output them to an operator of the evaluation device. This facilitates the identification of non-optimally arranged housing devices or of an at least non-optimally constructed hose guide.

Optionally, the device can therefore have an evaluation device which in particular can be integrated in a robot and which is configured to evaluate the spring elongation of the spring of the length compensating element detected by the first sensor element and/or a spring force determined by the sensor element. In dependence on this evaluation, the evaluation device can effect the outputting of a status warning message.

In a variant, the device can comprise for this purpose a display element which in particular can be integrated in a robot or in a shell element and which is configured for the visually perceptible outputting of the status warning message.

In a variant, the housing element can have a plurality of shell elements, in particular two or three shell elements, which are adapted together to at least partially enclose or surround the device interior having the at least two device openings. Each of the plurality of shell elements can be arranged on or fastened to at least one further shell element so as to be pivotable about a rotational axis.

In other words, the shell elements can each be pivotably and/or rotatably arranged on one another. The shell elements can in particular be arranged flush on one another. An advantage of this device is that, by pivoting or folding out one or more shell elements, the interior of the housing element can be freed for the arrangement of cable guides or corrugated hoses and, by subsequently folding in the sleeve element(s), the interior can be closed again, apart from the at least two device openings. The advantages of a tubular housing device, namely better protection of the housed cable guides or corrugated hoses from damage and better fixing or arrangement of the cable guides or corrugated hoses in all spatial directions, are thus combined with the advantages of a non-tubular device for housing cable guides and corrugated hoses, namely the possibility of arranging the cable guides or corrugated hoses in the housing device without having to guide them through the housing device from the hose end.

In a variant, the device has a housing element having at least three shell elements, wherein each of the three shell elements is arranged on one of the further shell elements so as to be pivotable/hinged or rotatable about a rotational axis. An advantage here is that the interior of the housing element can be opened further than is possible, for example, with two shell elements which are pivotable relative to one another. When two shell elements are used, a substantially cylindrical interior can be rendered accessible only to the extent that at least one of the shell elements shapes at least a half-cylinder on the base area of a semicircle. This means that a cable guide or corrugated hose must be arranged in the interior of the housing element substantially orthogonally to the arrangement opening formed by the pivoting of the shell elements, which limits the arrangement options and/or the arrangement flexibility of the device. However, when three or more shell elements which are pivotable relative to one another are used, the interior of the housing element can be freed with virtually any desired opening angle, for example with an opening angle of 270°, which allows a cable guide or corrugated hose to be arranged from at least virtually any desired direction. This is an advantage in the case of the arrangement of cable guides or corrugated hoses on robots or on other machines, because in practice the housing devices or dresspacks are not freely accessible to an installer, for example, from any spatial direction.

Optionally, at least one rotation element, for example a metal pin or a plastics pin, about which at least two of the shell elements are mounted so as to be pivotable about a rotational axis, can be enclosed completely by the two shell elements that are pivotably mounted about the rotation element. In other words, at least two shell elements can be pivotably or rotatably mounted by a rotation element, in particular a cylindrical rotation element, wherein one of the shell elements or both shell elements in conjunction form a casing for the rotation element which surrounds the rotation element at least partially, for example completely.

An advantage here is that the rotation element can be protected from the ingress of dirt into the bearing and from the ingress of liquids into the bearing, and a lubricant of the rotation element can remain in the casing formed by the shell elements. Furthermore, handling of the device is facilitated in that a user of the device cannot accidentally come into contact with a lubricant of the rotation element or bearing. In addition, the casing formed by the shell elements protects the rotation element from damage.

The device can further have at least one closing device which is arranged on one shell element or on a plurality of shell elements and is configured to detachably fasten at least two of the plurality of shell elements to one another. The closing device can in particular have at least one locking element which is displaceable and/or movable in a direction parallel to the rotational axis/axes and which is adapted to produce and/or release the detachable fastening.

The closing device can have, for example, one or more closure bars which are each arranged on one of the pivotable shell elements. The closure bars can be configured to be brought into engagement, optionally at least partially material-based engagement, with or arranged on a formation and/or a further closure bar on a further shell element. The locking element can in particular be configured to fix or to release for detachment an optionally at least partially material-based and/or interlocking contact of the closure bar(s) with one another and/or with the further shell element.

The at least one closure bar can have at least in some portions an at least partially T-shaped cross section. Optionally, the closure bar can be adapted to be brought into contact, in particular by interlocking engagement, at least in some portions with part of a further shell element, and/or to form together with the part of the further shell element at least in some portions an at least partially T-shaped cross section. The locking element can be adapted to be brought into contact, in particular by material-based and/or interlocking engagement, at least in some portions with the closure bar, for example by a user of the device.

The closure bar and/or one of the shell elements can have one or more latching projections which are adapted to detachably fix the displaceable locking element in a predetermined position and/or to provide pressure resistance against a displacement or movement of the locking element in a direction parallel to the rotational axis/axes.

In a variant, the latching projections can be adapted to detachably fix the displaceable locking element in three different predetermined positions and/or to provide pressure resistance against a displacement or movement of the locking element in a direction parallel to the rotational axis/axes, for example when the locking element is moved out of one of the three predetermined positions.

The locking element can optionally have handling grooves, in particular running in a direction substantially orthogonal to the rotational axis/axes. The handling grooves can make it easier for a user of the device to operate the locking element.

In a variant, the locking element can further be adapted to be brought into interlocking contact with a central element, in particular when the closing device detachably fastens at least two of the plurality of shell elements together. In other words, the locking element can be moved by a user of the device into a position in which it on the one hand lies against a central element of the closing device and on the other hand detachably fastens two of the plurality of shell elements together.

An advantage of the closing device is that it allows the interior of the housing element to be opened or freed and also closed, shaped or shut without an additional tool, that is to say tool-free. This simplifies and accelerates the arrangement of a cable guide or corrugated hose in the device.

Optionally, one or more of the shell elements, in particular at a device opening, can have a guide geometry formed into the interior. The guide geometry can be adapted to define and/or to influence a positioning of a cable guide or corrugated hose. In particular a specific intended arrangement of the cable guide or corrugated hose in the interior of the device can thus be ensured and/or improved.

In one embodiment, one, a plurality and/or all of the shell elements can have, in particular on an outer side of the shell elements, an in particular impressed indentation, guide, bead or groove. The shell elements, in particular the outer side of the shell elements, can have a manufacturing material with plastics material, in particular with polymer material, metal, carbon fibres, carbon fibre composite, ceramics and/or glass material.

An advantage of the in particular impressed guides, indentations, beads or grooves is that they can stiffen the shell elements and/or can improve the grip of the shell elements.

Furthermore, the shell elements can in particular be adapted to lie with an inner side opposite the outer side against a cable guide housed by the housing element, in particular against a corrugated hose housed by the housing element, and/or against the length compensating element. A guide for the housed cable guide or the housed corrugated hose and/or the length compensating element can thus be produced, which in particular facilitates and/or improves a correct arrangement of the cable guide or of the corrugated hose in the device interior and defines or establishes a movement path for the spring of the length compensating element, in particular in the form of guide rails. The movement of the spring with the cable guide or corrugated hose housing can thus take place without substantial radial play, which on the one hand contributes towards protecting the material of the spring and facilitates compression or extension of the spring. The shell elements can lie against and/or be brought into contact with a cable guide housed by the housing element, in particular against/with a corrugated hose, and/or against/with the length compensating element in particular with those regions of the inner side that are opposite an in particular impressed indentation, guide, bead or groove in the outer side of the shell elements.

In one embodiment, the device can have a second sensor element arranged in the device interior and adapted to detect a spring elongation or spring deflection of the spring of the length compensating element.

The device can further have a measuring element arranged on the spring of the length compensating element, in particular a measuring element arranged on the spring and/or on the cable guide or corrugated hose housing, which measuring element can in particular be a reflective element. Alternatively or in addition, the measuring element can also have a magnet, for example a permanent magnet. The measuring element can be arranged, for example, in a space between the first and the second sensor element.

The measuring element can in particular be a reflective element which is adapted, for example, to reflect laser light and/or infra-red light. The measuring element can be a reflective element which has a reflective surface oriented substantially orthogonally to a rotational axis of the shell elements. The reflective element can in particular be oriented such that a beam of laser light or infra-red laser light strikes the reflective surface substantially orthogonally.

The device interior enclosed by the shell elements can have an at least substantially cylindrical portion which is configured to house the length compensating element and/or at least part of a cable guide or at least part of a corrugated hose. The device interior can, for example, have an at least substantially cylindrical portion which is adapted to house corrugated hoses having a diameter of, for example, approximately 70 mm, 56 mm or 48 mm. The at least two device openings, which can always be maintained even after pivoting, rotation, folding in or closing of the shell elements and in particular are suitable for the passage of a cable guide, in particular a corrugated hose, which is to be housed by the device, can in particular be openings of an at least substantially cylindrical portion of the device interior.

In addition, the device interior enclosed by the shell element(s) can further have an at least substantially cuboidal portion which is adapted in particular to house the measuring element and/or the first sensor element and/or the second sensor element. The at least one substantially cuboidal portion of the device interior can be enclosed at least partially by one shell element and/or at least partially by a plurality of shell elements. An advantage of the at least one substantially cuboidal portion of the device interior is that this portion of the device interior is highly suitable in particular for the arrangement of additional device elements, in particular of sensor and/or measuring elements, and that the device elements so arranged in the device interior are likewise protected by the shell elements from contamination and damage.

The first and/or the second sensor element can in particular be an optically or magnetically detecting sensor element. For example, the first and/or the second sensor element can be adapted to emit laser light and/or infra-red light, in particular infra-red laser light, and to determine a spring elongation of the spring of the length compensating element by a transit time measurement and/or by triangulation of the laser light reflected by the measuring element. In other words, the first or/and the second sensor element can be distance measuring sensors which each determine, in particular with a beam of laser light, a distance between the first or/and the second sensor element and the measuring element arranged/fixed on the spring of the length compensating element. The distances so determined between the sensor element(s) and the measuring element correspond to a spring elongation or spring deflection of the spring of the length compensating element on which the measuring element is fastened. Conclusions about an instantaneous or recorded spring elongation or spring deflection can thus be determined by the sensor element(s) and/or by an evaluation device which communicates with the sensor element(s) via a radio link, for example.

Alternatively or in addition, the first and/or the second sensor element can also be a magnetically detecting sensor element which in particular has a Hall-effect sensor. The first and/or the second sensor element can, for example, be adapted to determine a spring elongation of the spring of the length compensating element on the basis of the detection of a magnetic field.

The first and/or the second sensor element can further be adapted to determine a spring force exerted by the spring on the shell element and/or on the cable guide or corrugated hose housing.

The sensor element(s) and/or the evaluation device can further be adapted to detect or determine on the basis of detected and/or recorded measurement data, for example by comparison with (pre)stored target data, a spring fatigue which occurs over a period of use, canting of the spring in the device interior, a deflection of the cable guide or corrugated hose and/or a position of the cable guide or corrugated hose or a position of the cable guide or corrugated hose portion. The sensor element(s) and/or the evaluation device can additionally be adapted to output an alarm and/or a maintenance notification to a user or to a person responsible for maintenance of the device in the case of a deviation of the determined or detected parameters from a predetermined or stored target value range.

In embodiments of the device which comprise at least two sensor elements, the first sensor element can be arranged at a first end of the device interior, in particular at a first end of an at least substantially cuboidal device interior portion. The second sensor element can be arranged at a second end, opposite the first end, of the device interior, in particular at a second end of an at least substantially cuboidal device interior portion. The first and the second sensor element can be arranged, for example, on mutually opposite side faces or (inner) walls of the device interior or of a device interior portion. The first and the second sensor element can each be adapted to direct a beam of laser light and/or infra-red light at a surface of the measuring element, which can be in particular a reflective element, wherein the surfaces of the measuring element that are irradiated with a laser beam and/or with infra-red light by the sensor elements are mutually opposite surfaces of the measuring element. The sensor elements and/or the evaluation device can further be adapted to compare and/or to average the measurement results/parameters determined by the first and by the second sensor element, in particular a spring elongation or spring deflection determined by the first and/or the second sensor element, in order thus to improve the accuracy of the measurement results and/or measured parameters.

In one embodiment, the fastening element of the device can be adapted to be arranged or to have been arranged on the fastening device by a screw connection. In other words, the fastening element can be capable of being arranged on the fastening device. Alternatively or in addition, the fastening element can have a toothing and can be adapted to engage by means of the toothing in an interlocking manner into a corresponding (counter-)toothing of the fastening device. The toothing of the fastening element and/or the toothing of the fastening device can each be adapted to permit a plurality of possible arrangement positions of the fastening element on the fastening device. In other words, the toothing of the fastening element and/or the toothing of the fastening device can be adapted not to define an arrangement position of the fastening element on the fastening device. The arrangement position of the fastening element on the fastening device can be variable or changeable.

Optionally, the fastening element can be adapted to be detachably fastened to the fastening device by one or more fastening bolts and/or by one or more fastening clips. The fastening bolt(s) and/or the fastening clip(s) can each engage both into prepared openings in the fastening element and into prepared openings in the fastening device. Furthermore, the fastening bolts and/or the fastening clips can each be capable of being inserted into the prepared openings in the fastening element and into the prepared openings in the fastening device in particular in a direction parallel to the rotational axis/axes or in a direction orthogonal to the rotational axis/axes. An advantage here is that the fastening element can be connected to the fastening device and/or also detached therefrom again without an additional and/or special tool. Installation of the device for housing cable guides or corrugated hoses can thus be simplified and accelerated.

The toothing of the fastening element can be arranged on a surface of the fastening element. Alternatively or in addition, the toothing of the fastening element can also be arranged on a locking prolongation of the fastening element.

The locking prolongation can be arranged on a further component of the fastening element, for example on a fastening element base body, so as to be pivotable about a fastening element axis. The fastening element axis can be arranged in particular parallel to the rotational axis/axes of the shell elements.

The toothing arranged on the locking prolongation can be adapted to be brought into interlocking engagement at least partially with the toothing of the fastening device by pivoting of the locking prolongation about the fastening element axis. Furthermore, the toothing arranged on the locking prolongation can be adapted to be detached at least partially from the toothing of the fastening device by pivoting of the locking prolongation about the fastening element axis.

An advantage of the pivotable locking element having a toothing is that a surface of the fastening element can also be formed without a toothing, which allows the fastening element to slide or be pushed over the toothing of a fastening device. The fastening element can thus first be pushed or moved over the toothing of a fastening device in a direction parallel to the fastening element axis and, once a desired position in a direction parallel to the fastening element axis has been reached, can be fixed to the fastening device by means of the pivotable locking element. Fixing of the fastening element to the fastening device can be achieved by bringing a toothing arranged on the locking prolongation into interlocking engagement at least partially with the toothing of the fastening device by pivoting the locking prolongation about the fastening element axis.

Optionally, the locking prolongation can have at least one, in particular resiliently deformable, locking prolongation latching element which is adapted to fix the locking prolongation to the housing element and/or to one of the shell elements of the housing element and/or to the fastening device when the toothing arranged on the locking prolongation is brought into engagement with the toothing of the fastening device.

An advantage of the in particular resiliently deformable locking prolongation latching element is that unintentional detachment of the locking prolongation from the housing element and/or from the fastening device can thus be prevented. Optionally, the locking prolongation having the locking prolongation latching element can be adapted to be detached from the housing element and/or from one of the shell elements of the housing element and/or from the fastening device again against a pressure resistance, so that the fixing effected by the locking prolongation latching element is reversed.

Optionally, a device for housing cable guides or corrugated hoses can have one or more sealing elements which are each arranged at and/or in one of the device openings and/or are adapted to lie against an at least partially housed cable guide, for example against a corrugated hose having a diameter of, for example, approximately 70 mm, 56 mm or 48 mm. The sealing elements can each be adapted to close one of the device openings in an at least substantially dust- and/or liquid-tight manner in conjunction with the housed cable guide or with the housed corrugated hose. Contamination of the device interior can thus be prevented.

A further device for housing cable guides or corrugated hoses has a housing element having at least one shell element which at least partially encloses a device interior having at least two device openings. At least one fastening element is arranged on the housing element and is configured to be detachably arranged on or fastened to a fastening device. The fastening element here has a shaped element, in particular a toothing. The fastening element is additionally configured and arranged to engage by means of the shaped element, in particular by means of the toothing, at least partially in an interlocking manner into the fastening device, in particular into a, in particular corresponding, (counter-)toothing of the fastening device, and/or to be arranged by means of the toothing at least partially in the, in particular corresponding, (counter-)toothing of the fastening device.

In a variant, the housing element can have a plurality of shell elements, in particular two or three shell elements, which are adapted together to at least partially enclose or surround the device interior having the at least two device openings. Each of the plurality of shell elements can be arranged on or fastened to at least one further shell element so as to be pivotable about a rotational axis.

In other words, the shell elements can each be pivotably and/or rotatably arranged on one another. The shell elements can be arranged on one another in particular in an interlocking manner and/or so as to be flush with one another. An advantage of this device is that, by pivoting or folding out one or more shell elements, the interior of the housing element can be freed for the arrangement of cable guides or corrugated hoses and, by subsequently folding in the sleeve element(s), the interior can be closed again, apart from the at least two device openings. The advantages of a tubular housing device, namely better protection of the housed cable guides or corrugated hoses from damage and better fixing or arrangement of the cable guides or corrugated hoses in all spatial directions, are thus combined with the advantages of a non-tubular housing device for cable guides or corrugated hoses, namely the possibility of arranging the cable guides or corrugated hoses in the housing device without having to guide them through the housing device from the hose end.

In a variant, the device has a housing element having at least three shell elements, wherein each of the three shell elements is arranged on one of the further shell elements so as to be pivotable/hinged or rotatable about a rotational axis. An advantage here is that the interior of the housing element can be opened further than is possible, for example, with two shell elements which are pivotable relative to one another. When two shell elements are used, a substantially cylindrical interior can be rendered accessible only to the extent that at least one of the shell elements shapes at least a half-cylinder on the base area of a semicircle. This means that a cable guide or corrugated hose must be arranged in the interior of the housing element substantially orthogonally to the arrangement opening formed by the pivoting of the shell elements, which limits the arrangement options and/or the arrangement flexibility of the device. However, when three or more shell elements which are pivotable relative to one another are used, the interior of the housing element can be freed with virtually any desired opening angle, for example with an opening angle of 270°, which allows a cable guide or corrugated hose to be arranged from at least virtually any desired direction. This is an advantage in the case of the arrangement of cable guides or corrugated hoses on robots or on other machines, because in practice the housing devices or dresspacks are not freely accessible to an installer, for example, from any spatial direction.

The device can further have at least one closing device which is arranged on one shell element or on a plurality of shell elements and is configured to detachably fasten at least two of the plurality of shell elements to one another. The closing device can in particular have at least one locking element which is displaceable and/or movable in a direction parallel to the rotational axis/axes and which is adapted to produce and/or release the detachable fastening.

The closing device can have, for example, one or more closure bars which are each arranged on one of the pivotable shell elements. The closure bars can be configured to be brought into engagement, optionally at least partially material-based engagement, with or arranged on a formation and/or a further closure bar on a further shell element. The locking element can in particular be configured to fix or to release for detachment an optionally at least partially material-based and/or interlocking contact of the closure bar(s) with one another and/or with the further shell element.

The at least one closure bar can have at least in some portions an at least partially T-shaped cross section. Optionally, the closure bar can be adapted to be brought into contact, in particular by interlocking engagement, at least in some portions with part of a further shell element, and/or to form together with the part of the further shell element at least in some portions an at least partially T-shaped cross section. The locking element can be adapted to be brought into contact, in particular by material-based and/or interlocking engagement, at least in some portions with the closure bar, for example by a user of the device.

The closure bar and/or one of the shell elements can have one or more latching projections which are adapted to detachably fix the displaceable locking element in a predetermined position and/or to provide pressure resistance against a displacement or movement of the locking element in a direction parallel to the rotational axis/axes.

In a variant, the latching projections can be adapted to detachably fix the displaceable locking element in three different predetermined positions and/or to provide pressure resistance against a displacement or movement of the locking element in a direction parallel to the rotational axis/axes, for example when the locking element is moved out of one of the three predetermined positions.

The locking element can optionally have handling grooves, in particular running in a direction substantially orthogonal to the rotational axis/axes. The handling grooves can make it easier for a user of the device to operate the locking element.

In a variant, the locking element can further be adapted to be brought into interlocking contact with a central element, in particular when the closing device detachably fastens at least two of the plurality of shell elements together. In other words, the locking element can be moved by a user of the device into a position in which it on the one hand lies against a central element of the closing device and on the other hand detachably fastens two of the plurality of shell elements together.

An advantage of the closing device is that it allows the interior of the housing element to be opened or freed and also closed, shaped or shut without an additional tool, that is to say tool-free. This simplifies and accelerates the arrangement of a cable guide or corrugated hose in the device.

Optionally, one or more of the shell elements, in particular at a device opening, can have a guide geometry formed into the interior. The guide geometry can be adapted to define and/or to influence a positioning of a cable guide or corrugated hose. In particular a specific intended arrangement of the cable guide or corrugated hose in the interior of the device can thus be ensured and/or improved.

In a variant, the device can have at least one length compensating element arranged in the device interior and having a spring. The spring can be fixed to or arranged, in particular non-resiliently, on one of the shell elements and/or a guide geometry and can have a cable guide or corrugated hose housing, wherein the cable guide or corrugated hose housing is adapted to be fixed to or arranged, in particular non-resiliently, on a cable guide or corrugated hose. The length compensating element and/or the spring can be adapted to shape or to surround a cable guide, in particular a corrugated hose, housed in the device interior of the device. In other words, a cable guide, in particular a corrugated hose, can be guided through the spring or through a spring interior shaped by the spring.

The spring can be a metal spring, in particular a steel spring. The spring can be fixed to or arranged, in particularly non-resiliently, on one of the shell elements and/or a guide geometry in particular with a first spring end. Optionally, the spring can be arranged by one or more spring arrangement elements on one or more shell elements. The cable guide or corrugated hose housing can in particular be fixed to or arranged, in particular non-resiliently, at a second spring end. Optionally, the cable guide or corrugated hose housing can have a housing ring which is adapted to house or fix a cable guide or a cable guide portion, for example a corrugated hose or corrugated hose portion, by material- and/or force-based engagement. In other words, the cable guide or the corrugated hose can be fastened substantially non-resiliently to the spring.

The length compensating element having the spring can in particular be adapted to house a cable guide, in particular a corrugated hose, fixed to or arranged on the cable guide or corrugated hose housing, with a material tension in a direction parallel to the rotational axis/axes.

Optionally, the spring can compress and/or squeeze the cable guide or corrugated hose fastened thereto to a predetermined degree at least in some portions, so that the hose is able to expand and/or be stretched (out) at least to a predetermined degree when a tensile force is exerted thereon, wherein, conversely, the spring fastened to the cable guide or to the corrugated hose is tensioned by the tensile force. If the tensile force exerted on the cable guide or on the corrugated hose diminishes, the tensile force acting on the spring also diminishes. In this case, the spring again compresses or squeezes the cable guide or the corrugated hose to a predetermined degree.

Furthermore, the spring can optionally be arranged in the device interior with a pre-tension or material tension, in particular in precompressed form, so that the spring, for example, exerts a force, in particular a counter-pressure, on the housed corrugated hose even without a tensile force being exerted on a cable guide housed by the device, in particular on a corrugated hose housed by the device.

An advantage of the length compensating element arranged in the device interior and having the spring is that, although a cable guide or a corrugated hose can be moved temporarily in the case of a robot movement, in particular can also be moved partially out of the device for housing cable guides or corrugated hoses, in order to compensate for the movement of the robot, it is moved back into the original arrangement position again by the spring when the robot movement is complete and/or when the robot has returned to the starting position. The cable guide or corrugated hose is thus housed with a certain play, in particular with a certain play in the hose direction, wherein an unwanted permanent movement of the cable guide or of the corrugated hose out of the device and/or (over)stretching of the cable guide or of the corrugated hose can be prevented.

In one embodiment, one, a plurality and/or all of the shell elements can have, in particular on an outer side of the shell elements, an in particular impressed indentation, guide, bead or groove. The shell elements, in particular the outer side of the shell elements, can have a manufacturing material with plastics material, in particular with polymer material, metal, carbon fibres, carbon fibre composite, ceramics and/or glass material.

An advantage of the in particular impressed guides, indentations, beads or grooves is that they can stiffen the shell elements and/or can improve the grip of the shell elements.

Furthermore, the shell elements can in particular be adapted to lie with an inner side opposite the outer side against a cable guide housed by the housing element or against a corrugated hose housed by the housing element and/or against the length compensating element. A guide for the housed cable guide or the housed corrugated hose and/or the length compensating element can thus be produced, which in particular facilitates and/or improves a correct arrangement of the cable guide or of the corrugated hose in the device interior and defines or establishes a movement path for the spring of the length compensating element, in particular in the form of guide rails. The movement of the spring with the cable guide or corrugated hose housing can thus take place without substantial radial play, which on the one hand contributes towards protecting the material of the spring and facilitates compression or extension of the spring. The shell elements can lie against and/or be brought into contact with a cable guide housed by the housing element, in particular against/with a corrugated hose, and/or against/with the length compensating element in particular with those regions of the inner side that are located opposite an in particular impressed indentation, guide, bead or groove in the outer side of the shell elements.

Optionally, at least one rotation element, for example a metal pin or a plastics pin, about which at least two of the shell elements are mounted so as to be pivotable about a rotational axis, can be enclosed completely by the two shell elements that are pivotably mounted about the rotation element. In other words, at least two shell elements can be pivotably or rotatably mounted by a rotation element, in particular a cylindrical rotation element, wherein one of the shell elements or both shell elements in conjunction form a casing for the rotation element which surrounds the rotation element at least partially, for example completely.

An advantage here is that the rotation element can be protected from the ingress of dirt into the bearing and from the ingress of liquids into the bearing, and a lubricant of the rotation element can remain in the casing formed by the shell elements. Furthermore, handling of the device is facilitated in that a user of the device cannot accidentally come into contact with a lubricant of the rotation element or bearing. In addition, the casing formed by the shell elements protects the rotation element from damage.

The device interior enclosed by the shell elements can have an at least substantially cylindrical portion which is configured to house the length compensating element and/or at least part of a cable guide or of a corrugated hose. The device interior can, for example, have an at least substantially cylindrical portion which is adapted to house corrugated hoses having a diameter of, for example, approximately 70 mm, 56 mm or 48 mm. The at least two device openings, which can always be maintained even after pivoting, rotation, folding in or closing of the shell elements and in particular are suitable for the passage of a cable guide, in particular a corrugated hose, which is to be housed by the device, can in particular be openings of an at least substantially cylindrical portion of the device interior.

Furthermore, the device interior enclosed by the shell elements can have an at least substantially cuboidal portion which in particular is adapted to house one or more sensor elements. The at least one substantially cuboidal portion of the device interior can be enclosed at least partially by one shell element and/or at least partially by a plurality of shell elements. An advantage of the at least one substantially cuboidal portion of the device interior is that this portion of the device interior is highly suitable in particular for the arrangement of additional device elements, in particular of sensor elements, and that the device elements so arranged in the device interior are likewise protected by the shell elements from contamination and damage.

For example, the device can have at least one sensor element which is adapted to detect a spring elongation or spring deflection of the spring of the length compensating element, wherein the at least one sensor element can be, for example, an optically detecting sensor element. Alternatively, the sensor element can also be a non-optically detecting sensor element, for example a tensile force sensor or a spring sensor. In a variant, the sensor element can also be a magnetically detecting sensor element, for example a Hall-effect sensor.

Optionally, a device for housing cable guides or corrugated hoses can have one or more sealing elements which are each arranged at and/or in one of the device openings and/or are adapted to lie against an at least partially housed cable guide, in particular against a corrugated hose, for example against a corrugated hose having a diameter of, for example, approximately 70 mm, 56 mm or 48 mm. The sealing elements can each be adapted to close one of the device openings in an at least substantially dust- and/or liquid-tight manner in conjunction with the housed cable guide or with the housed corrugated hose. Contamination of the device interior can thus be prevented.

The toothing of the fastening element which is provided for fastening the device for housing cable guides or corrugated hoses to the fastening device can have a plurality of material projections and/or material indentations or material notches which are formed identically to one another or differently from one another. In other words, the toothing can form a plurality of folds and a plurality of grooves which are each configured to engage into folds and grooves which are formed by a (counter-)toothing of the fastening device, and/or which are each adapted to come into contact by interlocking and/or force-based engagement with folds and grooves which are formed by a (counter-)toothing of the fastening device. At least some of the plurality of material projections and/or material indentations can have the form of a prism, in particular the form of a trapezoidal prism or a cuboidal form.

The toothing of the fastening element can have a plurality of material apertures and/or a plurality of material openings, in particular one or more material apertures and/or one or more material openings in each of the material projections formed identically to one another or differently from one another.

Optionally, the fastening element can be adapted to be detachably fastened to the fastening device by one or more fastening bolts and/or by one or more fastening clips. The fastening bolt(s) and/or the fastening clip(s) can each engage both into prepared openings in the fastening element and into prepared openings in the fastening device, in particular into the material apertures and/or the material openings in the plurality of material projections. Furthermore, the fastening bolts and/or the fastening clips can each be capable of being inserted into the prepared openings in the fastening element and into the prepared openings in the fastening device in particular in a direction parallel to the rotational axis/axes or in a direction orthogonal to the rotational axis/axes. An advantage here is that the fastening element can be connected to the fastening device and/or also detached therefrom again without an additional and/or special tool. Installation of the device for housing cable guides or corrugated hoses can thus be simplified and accelerated.

In a variant, the fastening element can have a first at least partially resiliently deformable latching element which is arranged and configured to be arranged in a first indentation, in particular in a first undercut, in a first side face of a fastening device. The fastening element can further have a second at least partially resiliently deformable latching element which is arranged and configured to be arranged in a second indentation, in particular in a second undercut in a second side face located opposite the first side face of a fastening device. The first and the second latching element can be configured asymmetrically to one another.

The first at least partially resiliently deformable latching element can comprise, for example, an at least partially resiliently deformable web and/or an at least partially resiliently deformable wall and/or a material projection or a material bulge which is arranged on the web or the wall and is configured to engage into an indentation, which in particular is an undercut, arranged laterally on the fastening device. The second at least partially resiliently deformable latching element can optionally also comprise an at least partially resiliently deformable web and/or an at least partially resiliently deformable wall and/or a material projection or a material bulge which is arranged on the web or the wall and is configured to engage into an indentation, which in particular is an undercut, arranged laterally on the fastening device. The first and the second at least partially resiliently deformable latching elements can differ, for example, in that the material projection or the material bulge of the first latching element is configured to be stepped or raised and/or to project significantly higher/greater/further relative to the web or wall on which it is arranged than the material projection or the material bulge of the second latching element is stepped or raised and/or projects relative to the web or the wall on which it is arranged. In other words, the material projection of the first latching element can be larger and/or can project further relative to the web or the wall of the latching element than the material projection of the second latching element. Correspondingly, the indentations, which in particular are undercuts, can also be formed asymmetrically in the fastening device.

An advantage of the mutually asymmetrical latching elements is that the fastening element can easily be arranged on and fastened to the fastening device without an additional tool, in particular by a rotational movement, but unintentional detachment of the fastening element from the fastening device is considerably more difficult. Owing to the asymmetric configuration of the latching elements, a tilting and pulling movement which is carried out at least partially is required in order to detach the fastening element from the fastening device, such a movement at least only rarely being unintentionally carried out by a user of the device or occurring as a result of a collision of the device with other machine parts.

The material projections and/or material indentations of the toothing can each have at least one straight edge which in each case is arranged parallel or orthogonal to the rotational axis/axes or runs parallel or orthogonal to the rotational axis/axes.

The toothing of the fastening element can be arranged on a surface of the fastening element. Alternatively or in addition, the toothing of the fastening element can also be arranged on a locking prolongation of the fastening element.

The locking prolongation can be arranged on a further component of the fastening element, for example on a fastening element base body, so as to be pivotable about a fastening element axis. The fastening element axis can in particular be arranged parallel to the rotational axis/axes of the shell elements.

The toothing arranged on the locking prolongation can be adapted to be brought into interlocking engagement at least partially with the toothing of the fastening device by pivoting of the locking prolongation about the fastening element axis. Furthermore, the toothing arranged on the locking prolongation can be adapted to be detached at least partially from the toothing of the fastening device by pivoting of the locking prolongation about the fastening element axis.

An advantage of the pivotable locking element having a toothing is that a surface of the fastening element can also be configured without a toothing, which allows the fastening element to slide or be pushed over the toothing of a fastening device. The fastening element can thus first be pushed or moved over the toothing of a fastening device in a direction parallel to the fastening element axis and, once a desired position in a direction parallel to the fastening element axis has been reached, can be fixed to the fastening device by means of the pivotable locking element. Fixing of the fastening element to the fastening device can be achieved by bringing a toothing arranged on the locking prolongation into interlocking engagement at least partially with the toothing of the fastening device by pivoting the locking prolongation about the fastening element axis.

Optionally, the locking prolongation can have at least one, in particular resiliently deformable, locking prolongation latching element which is adapted to fix the locking prolongation to the housing element and/or to one of the shell elements of the housing element and/or to the fastening device when the toothing arranged on the locking prolongation is brought into engagement with the toothing of the fastening device.

An advantage of the in particular resiliently deformable locking prolongation latching element is that unintentional detachment of the locking prolongation from the housing element and/or from the fastening device can thus be prevented. Optionally, the locking prolongation having the locking prolongation latching element can be adapted to be detached from the housing element and/or from one of the shell elements of the housing element and/or from the fastening device again against a pressure resistance, so that the fixing effected by the locking prolongation latching element is reversed.

A fastening device disclosed herein has a toothing which is adapted to be arranged at least partially in an interlocking manner on the fastening element of a device described hereinbefore. The fastening device as such can already have been integrated in a robot or in a machine and/or in a building installation or in a building element and/or have been arranged on such objects, for example by a screw connection.

In one embodiment, the fastening device can be adapted to be arranged or to have been arranged on a robot, on a machine and/or on a building element by a screw connection.

The toothing of the fastening element and/or the toothing of the fastening device can each be adapted to permit a plurality of possible arrangement positions of the fastening element on the fastening device. In other words, the toothing of the fastening element and/or the toothing of the fastening device can be adapted not to define an arrangement position of the fastening element on the fastening device. The arrangement position of the fastening element on the fastening device can be variable.

Optionally, the fastening device can further have one or more, in particular two, cable guiding arms which are arranged on the fastening device and are configured to fix and/or arrange in a predetermined position a part or a portion of a cable guide, in particular of a corrugated hose or corrugated tube, that is not arranged in the device interior of the housing element. The cable guiding arms can in particular be arrangement elements, webs or material projections protruding laterally from the fastening device. Optionally, the in particular laterally protruding cable guiding arms can be suitable for arranging a part or a portion of a cable guide, in particular of a corrugated hose or corrugated tube, that is not housed in the device interior of the housing element parallel to that part or portion of the cable guide, in particular of the corrugated hose or corrugated tube, that is housed in the device interior of the housing element. In other words, the cable guiding arms can be adapted to define, produce or at least support, at least in some portions, a specific run or an arrangement of the cable guide, in particular of the corrugated hose or of the corrugated tube, outside the interior of the housing device. Optionally, this run of the cable guide, in particular of the corrugated hose or of the corrugated tube, in some portions can be arranged parallel to that part or portion of the cable guide, in particular of the corrugated hose or of the corrugated tube, that is housed by the housing device and is arranged in the device interior.

A cable guide or corrugated hose fastening system disclosed herein additionally has at least one of the devices described hereinbefore for housing cable guides or corrugated hoses, at least one of the fastening devices described hereinbefore, and/or at least one cable guide or corrugated hose, wherein the cable guide or the corrugated hose is arranged at least partially in the device interior of the housing element of the device for housing cable guides or corrugated hoses.

Further features, properties, advantages and possible modifications will become clear to a person skilled in the art from the following description, in which reference is made to the accompanying drawings. In the drawings, all the features described and/or depicted show the subject-matter disclosed herein on their own or in any desired combination. The dimensions and proportions of the devices and components shown in the figures are not to scale.

The drawings each show embodiments of devices adapted to house corrugated hoses which are representative for all types of cable guides. However, the devices shown are also equally suitable for housing corrugated pipes and/or other cable guides, for example smooth tubes or smooth hoses for cable guiding. The schematic drawings, like the following description based on the drawings, therefore each relate also to devices for housing cable guides that are not corrugated hoses, corrugated hoses being described and shown merely as representatives for all cable guides.

BRIEF DESCRIPTION OF THE DRAWINGS

FIG. 2 shows, schematically, an example of a housing element of a device for housing corrugated hoses in a sectional representation, wherein the housing element has two shell elements which are connected together and are pivotable about a rotational axis and which together enclose a device interior.

Unless explicitly indicated otherwise, components and constituent parts that correspond or that are comparable in their function are provided with corresponding reference signs in the schematic FIGS. 1 to 14C. The figures are explicitly schematic and explicitly not drawn true to scale.

DETAILED DESCRIPTION

Figure 1:
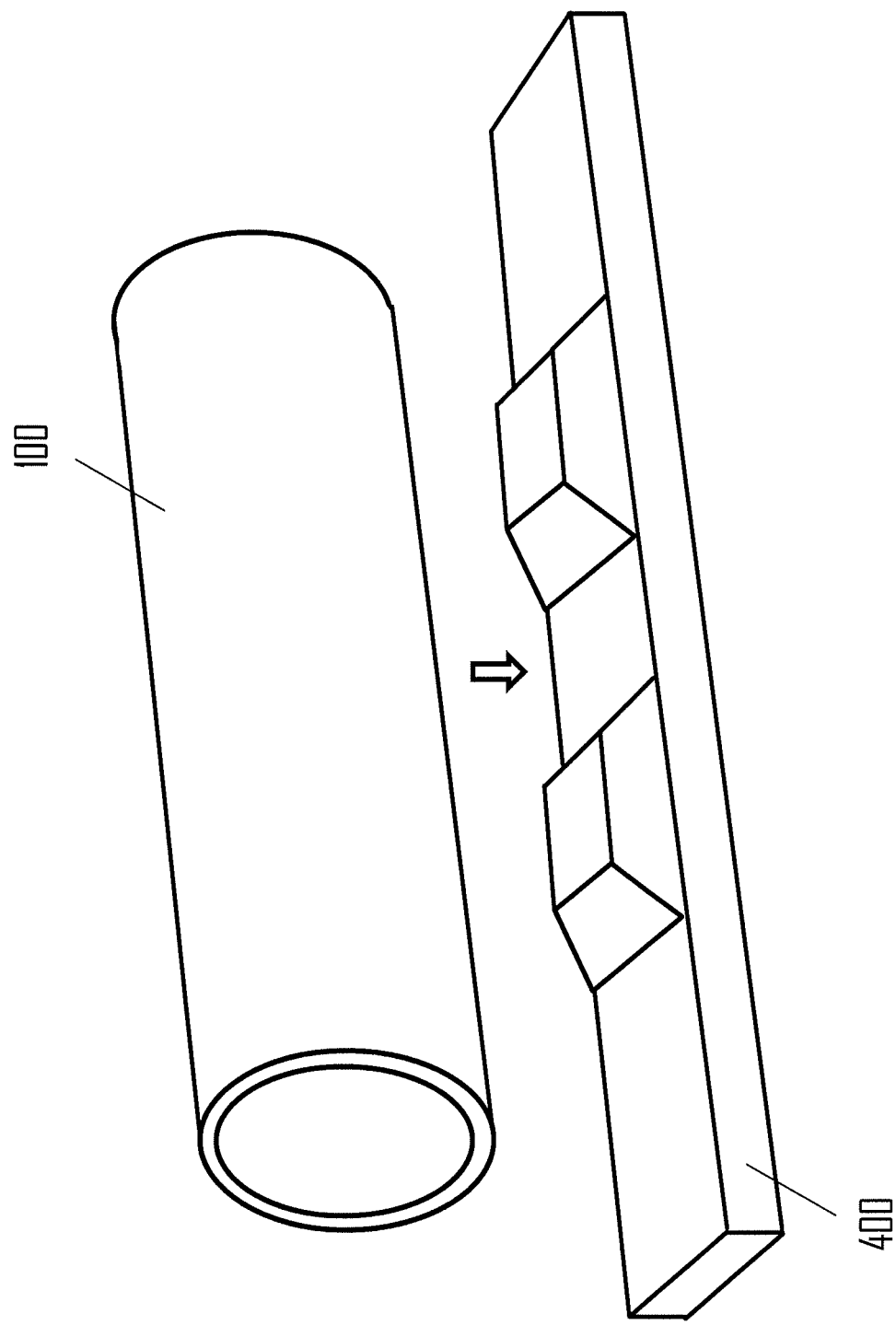
FIG. 1 shows, schematically, an example of a device for housing corrugated hoses.

FIG. 1 shows, schematically, an example of a device for housing corrugated hoses having a tubular housing element 100 which is arranged on a fastening device or fastening bar 400. The tubular housing element 100 is here adapted to arrange a corrugated hose that is guided through it, for example for a robotic arm (not shown), at a specific position, namely in the region of the fastening device 400. The hose can here be pulled or moved through the tubular housing element 100 in the hose longitudinal direction, for example by the movement of a robotic arm. It is further necessary, in order to arrange a corrugated hose in the tubular housing element 100, to guide the corrugated hose at least partially through the tubular housing element 100 starting from a corrugated hose end, which in particular makes it necessary to subsequently arrange an already installed corrugated hose in the device for housing corrugated hoses that is shown.

FIG. 2 shows, schematically, an example of a housing element 110 of a device for housing corrugated hoses, in a sectional representation. The housing element 110 has two shell elements 110a and 110b which are connected together and are pivotable about a rotational axis X1 and which together enclose a device interior. As is shown schematically in FIG. 2, the arrangement of the shell elements 110a and 110b so as to be pivotable relative to one another allows the device interior of the housing element 110 to be freed or opened at least temporarily so that a corrugated hose (not shown) can be arranged in the device. This is advantageous in particular for the arrangement of an already installed or at least partially installed corrugated hose, because the corrugated hose does not have to be guided through the device interior starting from a corrugated hose end. As can be seen from the sectional representation shown in FIG. 2, each of the two shell elements 110a and 110b is half-tube-shaped. This is advantageous or without any alternative in the case of exactly two shell elements 110a and 110b which are pivotable relative to one another, because a corrugated hose that utilises the full diameter of the device interior could otherwise not be introduced at least into one of the shell elements. The arrangement of the corrugated hose or corrugated tube must therefore take place from a direction substantially orthogonal to the freed device interior.

Figure 3:
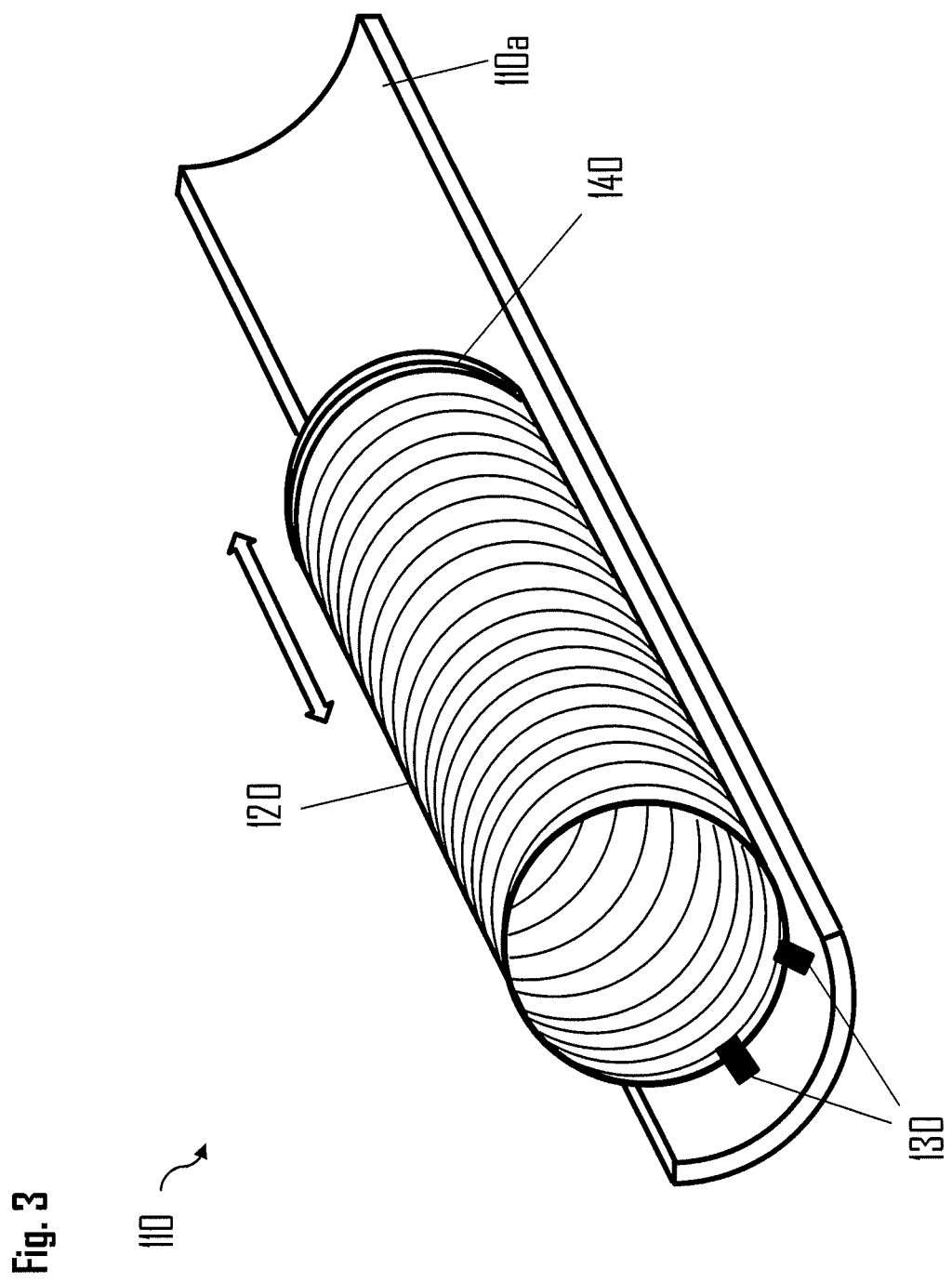
FIG. 3 shows, schematically, an example of a length compensating element which has a spring and is arranged in a device interior of a device for housing corrugated hoses.

FIG. 3 shows, schematically, an example of a length compensating element which has a spring 120 and which is arranged in a device interior of a device for housing corrugated hoses. The length compensating element is arranged in the interior of the housing element 110 shown in FIG. 2. However, only part of the pivotable shell element 110a is shown in FIG. 3 for the sake of clarity. The length compensating element has a spring 120 of spring steel. The spring 120 is fastened to the shell element 110a by two spring arrangement elements 130. However, in other examples (not shown), the spring can also be fastened to one of the shell elements by a different number of spring arrangement elements and/or without spring arrangement elements, in particular non-resiliently. The spring 120 shown further has a corrugated hose housing 140 which is adapted to be fastened non-resiliently to a corrugated hose (not shown), so that a movement of the corrugated hose in the longitudinal or corrugated hose direction is possible only in conjunction with the compression or extension of the spring 120. The corrugated hose is guided through the spring 120 and the corrugated hose housing 140, so that the spring 120 and the corrugated hose housing 140 surround the housed corrugated hose. The corrugated hose connected by the corrugated hose housing 140 to the spring 120 of the length compensating element thus remains movable in the longitudinal or corrugated hose direction, albeit against a spring resistance. However, once a (tensile) force acting on the corrugated hose has been removed or has ended, the spring 120 moves the corrugated hose into the original arrangement position again. This prevents the corrugated hose from being permanently shifted or displaced by a tensile force that acts only temporarily. In other embodiments (not shown), the spring can be arranged in the interior of the housing element such that it has a (spring) pre-tension even when no external (tensile) force is acting on a housed corrugated hose. A (tensile) force exerted on the corrugated hose can thus be counteracted more strongly.

Figure 4:
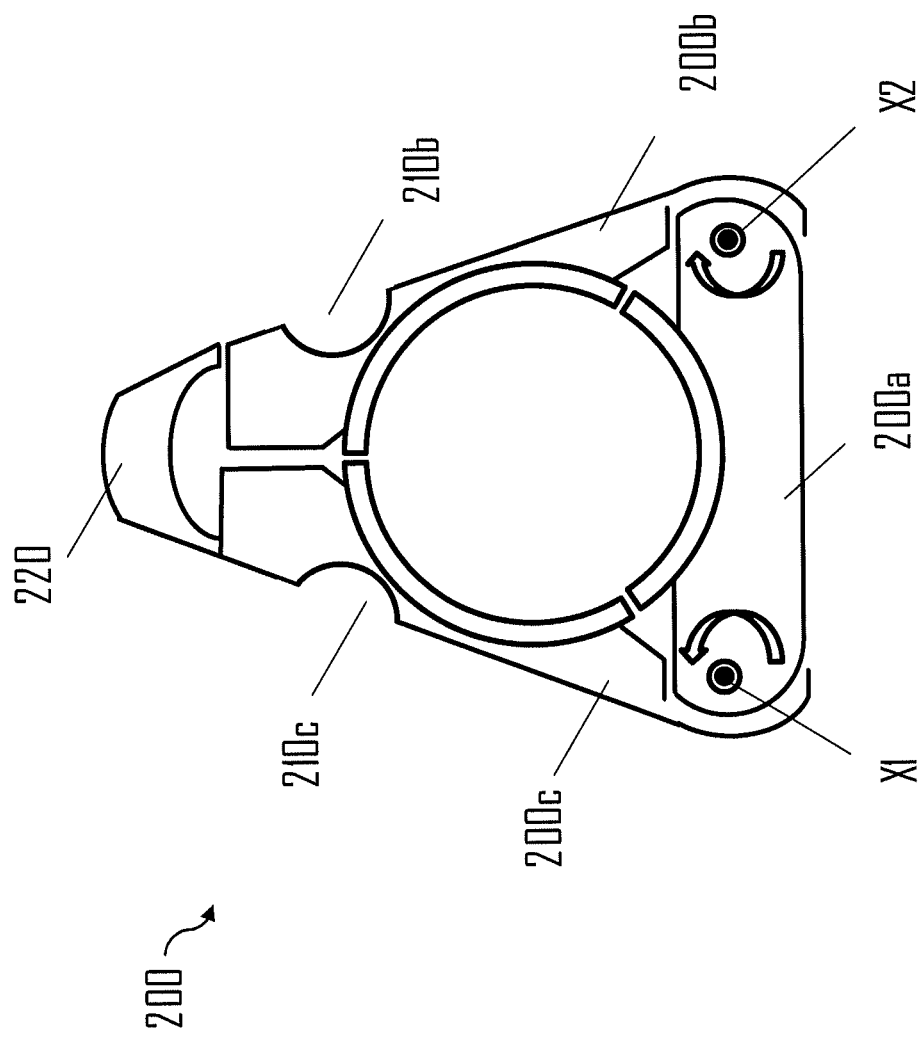
FIG. 4 shows, schematically, an example of a housing element of a device for housing corrugated hoses in a sectional representation, wherein the housing element has three shell elements which are connected together and are each pivotable about a rotational axis, and which together at least partially enclose a device interior.

FIG. 4 shows, schematically, an example of a housing element 200 of a device for housing corrugated hoses in a sectional representation, wherein the housing element 200 has three shell elements 200a, 200b and 200c which are connected together and are pivotable about a rotational axis X1 or X2 and which together at least partially enclose a device interior.

As is made clear by FIG. 4, a housing element 200 can also have more than two, for example three, shell elements which are pivotable relative to one another. The three shell elements 200a, 200b and 200c which are pivotable relative to one another are each arranged on at least one further shell element so as to be pivotable about a rotational axis X1, X2. Thus, the shell element 200a is connected to the shell element 200c so as to be pivotable about the rotational axis X1 and to the shell element 200b so as to be pivotable about the rotational axis X2.

Figure 5:
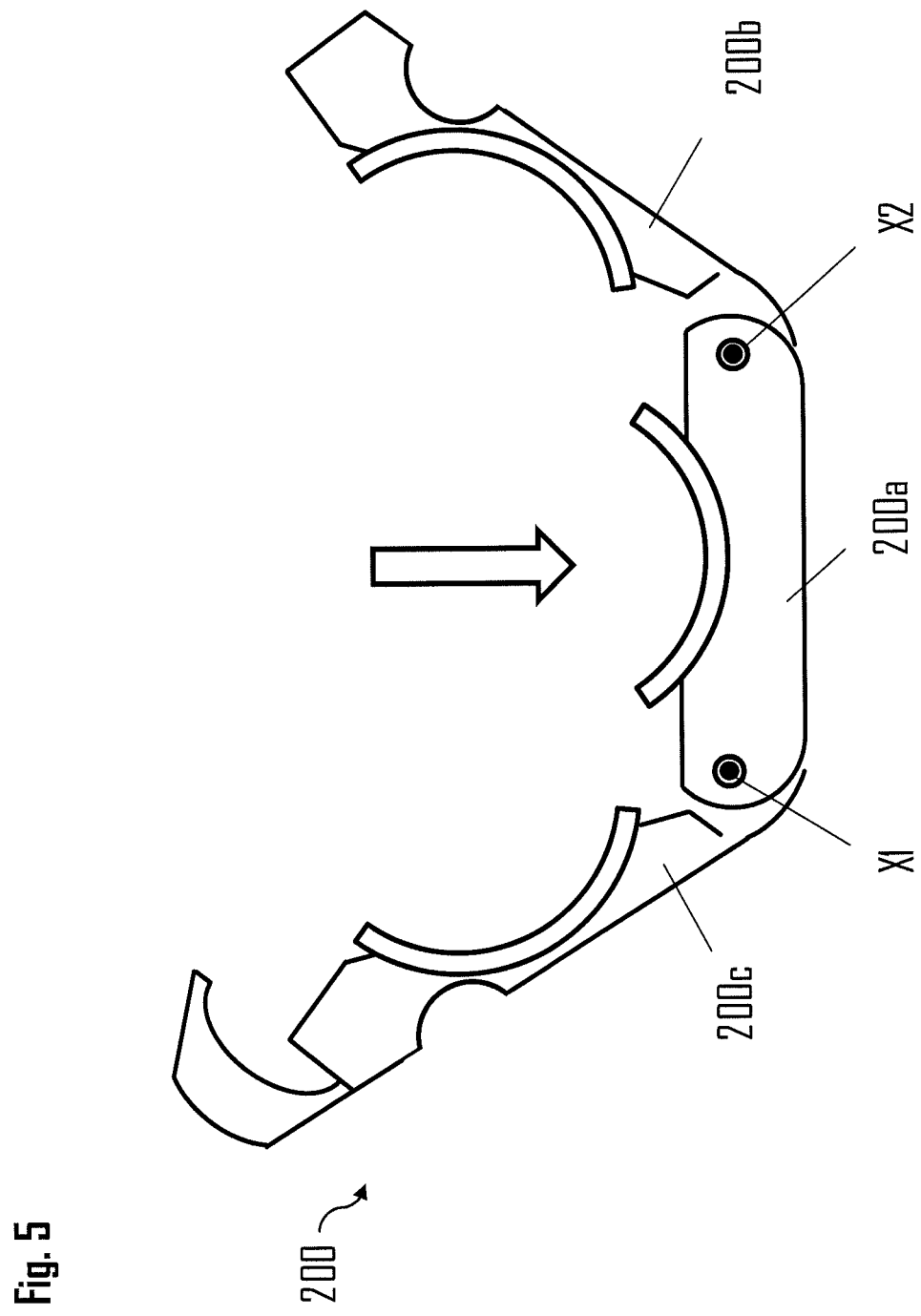
FIG. 5 shows, schematically, an example of the freeing of a device interior of a device for housing corrugated hoses by pivoting a plurality of shell elements, in a sectional representation.

As is shown by FIG. 5, the arrangement of at least three shell elements 200a, 200b, 200c which are pivotable relative to one another allows a substantially larger opening angle for at least temporarily freeing the device interior to be achieved than in the case of the arrangement shown in FIG. 2 with only two shell elements which are pivotably connected together. An advantage here is that a corrugated hose to be arranged in the device interior can also be inserted into the device interior from directions other than a direction substantially orthogonal to a half-tube. In other words, a possible arrangement angle for a corrugated hose (not shown) is substantially wider, which is particularly advantageous in particular for the installation of already partially pre-installed corrugated hoses, because they can be arranged in the housing element in devices having at least three shell elements, subject to corresponding rotation or pivoting of the shell elements, also from a direction lateral to the fastening device, for example. Moreover, a device having at least three shell elements is more flexible and more convenient to use compared to the device shown in FIG. 2.

FIGS. 4 and 5 further show that at least some of the shell elements, for example the shell elements 200b and 200c, can have impressed indentations or beads 210b and 210c, which can advantageously contribute in several ways to the functioning of the device. Firstly, the indentations or beads 210b and 210c can stiffen and/or stabilise the shell elements, which can be manufactured from a polymer material or from a metal, for example, so that a material-saving implementation of the shell elements with comparatively smaller material thicknesses for the outer walls of the shell elements is also made possible. The impressed indentations or beads 210b and 210c on the inner side of the shell elements opposite the outer side can further form guide rails for a corrugated hose that is to be housed and/or for a spring of a length compensating element (not shown in FIGS. 4 and 5), which can enforce or at least assist with a specific designated arrangement of the corrugated hose and/or of the spring in the device interior of the housing element 200, in particular the housing element which has been closed again after the arrangement of the corrugated hose.

The device shown in FIGS. 4 and 5 further has at least two metal pins which serve as bearing elements for the shell elements 200a, 200b and 200c mounted so as to be pivotable about the axes X1 and/or X2. In the example shown, these bearing elements are enclosed completely by the shell elements 200a, 200b and 200c, so that they are protected from contamination, damage or the escape of lubricant.

Figure 6:
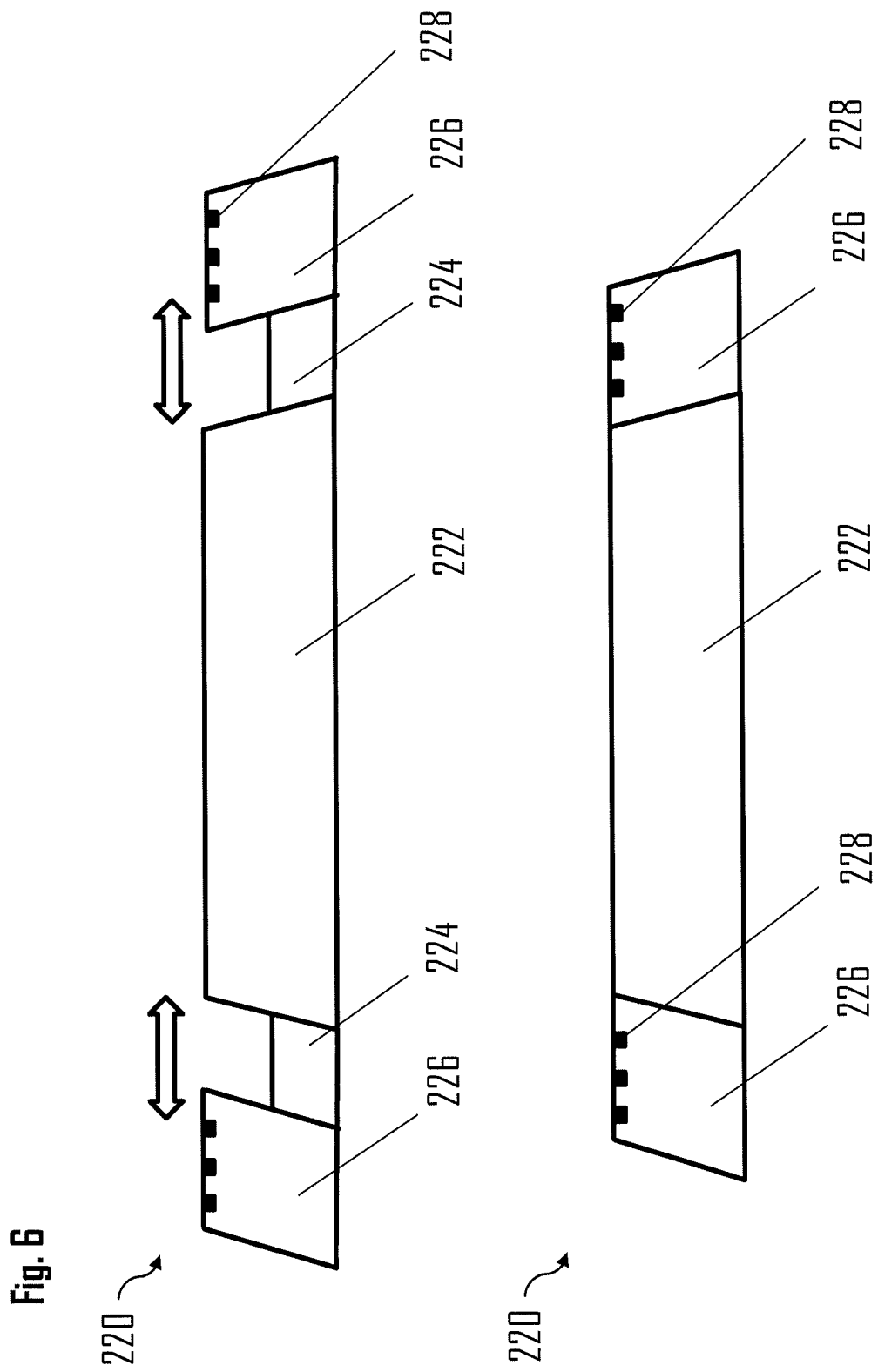
FIG. 6 shows, schematically, an example of a closing element for a device for housing corrugated hoses.

FIGS. 4 and 5 additionally show the closing element 220 (closing device) which is fastened to the shell element 200c and is shown in a side view in FIG. 6. As well as comprising a central element 222 immovably arranged on the shell element 200c, the closing element 220 comprises the two closure bars 224 which are likewise arranged on the shell element 220c and which are adapted to be brought into interlocking contact with a respective correspondingly formed portion of the shell element 200b. As soon as this interlocking contact between the closure bars 224 and the correspondingly formed portions of the shell element 200b has been established, the locking elements 226, which are movable in the direction parallel to the rotational axes X1 and X2, can be brought or moved into contact with the closure bars 224 and the correspondingly formed portions of the shell element 200b. For this purpose, the locking elements 226 can be pushed by a user of the device over the closure bars 224 and the correspondingly formed portions of the shell element 200b. In this position, namely in the locking position, the locking elements 226 surround both the closure bars 224 and the correspondingly formed portions of the shell element 200b at least in an interlocking manner and thus prevent the closure bars 224 from becoming detached from the correspondingly formed portions of the shell element 200b. In order to release the closure element 220 and in order to make the device interior accessible, the locking elements 226 can at a later time be moved back into the starting position prior to locking of the device and/or prior to fastening of the shell elements 200b and 200c to one another. In order to improve the handleability of the closing element 220 further and in particular to prevent an operator from accidentally letting go of the locking elements 226, the locking elements 226 each have handling grooves 228 on their surface. An advantage of the closing element 220 is that the device interior can be made accessible for the arrangement or for the removal of an arranged corrugated hose without the use of tools by a user of the device.

Figure 7:
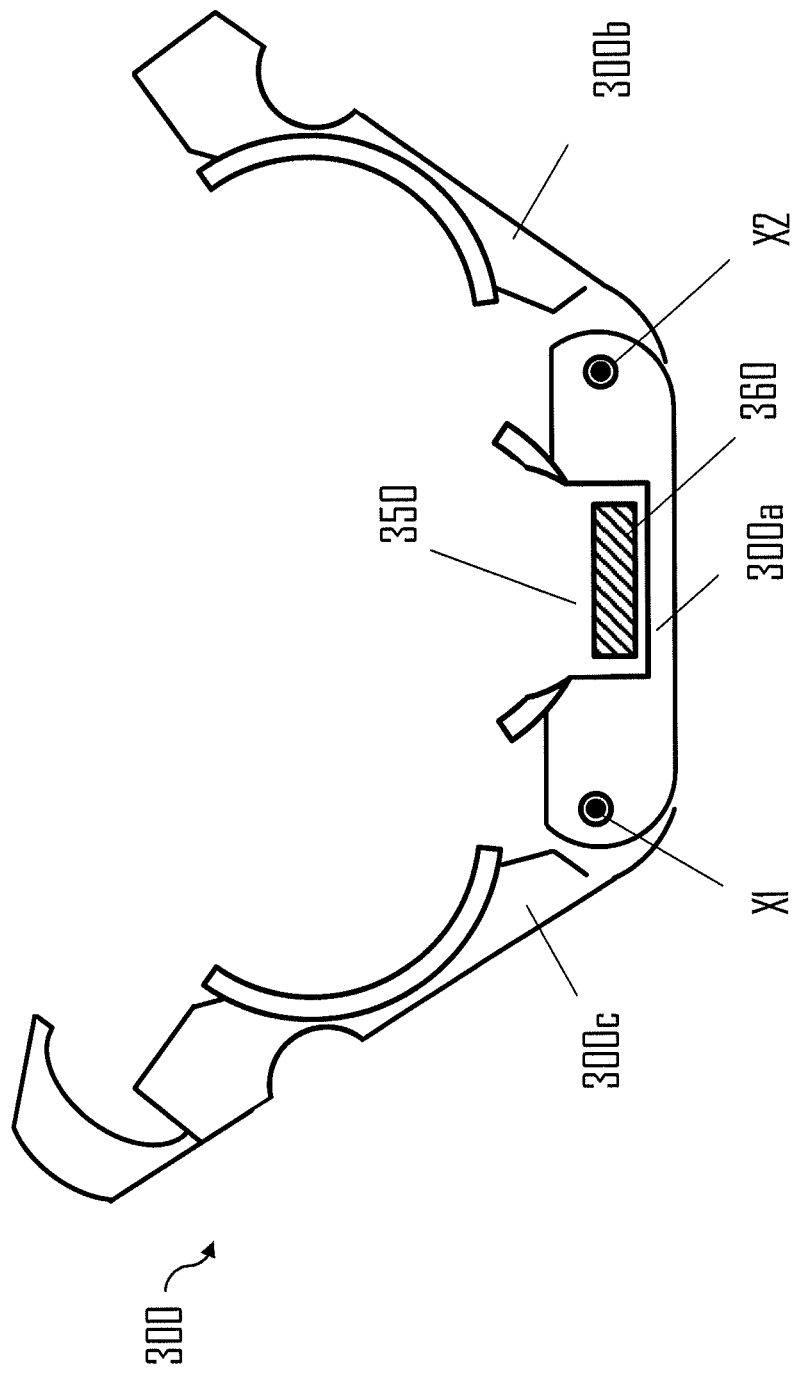
FIG. 7 shows, schematically, an example of a device for housing corrugated hoses having a substantially cuboidal device interior portion.

FIG. 7 shows, in a sectional representation, that the device interior of a housing element 300 having three shell elements 300a, 300b and 300c which are each pivotable about an axis X1 and/or X2 can have, in addition to a substantially cylindrical portion for housing a corrugated hose (not shown), also a substantially cuboidal device interior portion 350 in which further device elements, for example the sensor element 360 and/or further device elements, can be arranged.

FIG. 7 shows that the substantially cuboidal device interior portion 350 is at least partially surrounded and shaped by the shell element 300a, but in further embodiments (not shown), substantially cuboidal device interior portions that are at least partially shaped or surrounded by a plurality of pivotable shell elements, in particular two pivotable shell elements, are also possible.

Figure 8:
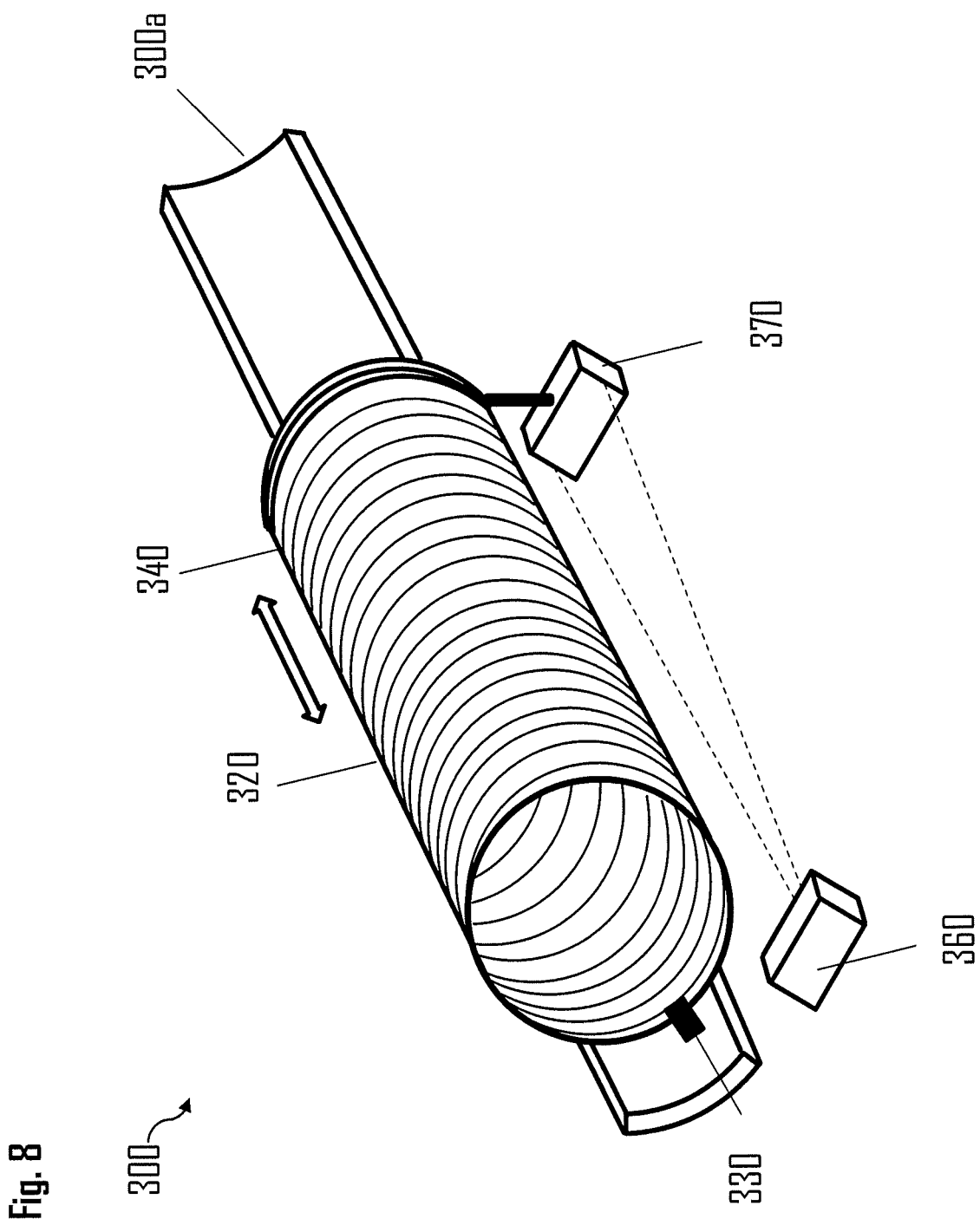
FIG. 8 shows, schematically, an example of a length compensating element which is arranged in a device interior of a device for housing corrugated hoses and which has a spring and a sensor element for measuring a spring elongation.

FIG. 8 shows an example of the arrangement of a sensor element 360 and of a reflective element 370 in the substantially cuboidal device interior portion 350, shown schematically in FIG. 7, of the device for housing corrugated hoses having the housing element 300. Correspondingly to the length compensating element shown in FIG. 3 and described hereinbefore, FIG. 8 also shows a spring 320 which is fastened by means of at least one spring arrangement element 130 to the shell element 300a, which for reasons of clarity is shown schematically only in part. Correspondingly to the length compensating element shown in FIG. 3 and described hereinbefore, the spring 320 shown in FIG. 8 also has a corrugated hose housing 340 which is configured correspondingly to the corrugated hose housing shown in FIG. 3 and is intended to be fastened in particular non-resiliently to a corrugated hose (not shown) to be housed. Alternatively or in addition, the corrugated hose housing 340 can also be adapted to be pressed against the spring 320 so that the corrugated hose housing 340 tracks a movement of the spring 320. In addition to these device elements, however, the device shown schematically in FIG. 7 also has the optically detecting sensor element 360, which is arranged in the substantially cuboidal device interior portion 350 shown in FIG. 8, and the reflective element 370, which is likewise arranged in this substantially cuboidal device interior portion 350. The substantially cuboidal device interior portion 350 itself is not shown in FIG. 8 for reasons of clarity and is merely adumbrated by the shell element 300a, which is shown in part. The sensor element 360 is fastened to a wall, formed by the shell element 300a, of the substantially cuboidal device interior portion 350.

In the example shown, the reflective element 370 is fastened to the corrugated hose housing 340. The reflective element 370 therefore follows the movement of the corrugated hose housing 340, which in turn corresponds directly to the spring deflection or spring elongation of the spring 320, because the corrugated hose housing 340 is fastened at least substantially non-resiliently to the spring 320 and/or because the corrugated hose housing 340 tracks the movement of the spring 320.

The corrugated hose housing 340 is further adapted to be fastened at least substantially non-resiliently to a corrugated hose (not shown) housed by the device, so that the corrugated hose housing 340 and the reflective element 370 directly follow a movement of the housed corrugated hose, wherein the position and/or movement of the corrugated hose housing 340 and of the reflective element 370 correspond directly to the spring deflection or spring elongation of the spring 320.

The sensor element 360 shown in FIG. 8 is adapted to direct a beam of laser light onto the reflective element 370 and to determine a distance between the sensor element 360 and the reflective element 370 by means of a transit time measurement and/or by triangulation of the laser light reflected by the reflective element 370 and then detected by the sensor element 360 again. The laser light can be in particular infra-red laser light. In a second step, the sensor element 360 or an external evaluation device (not shown) can determine a spring deflection or a spring elongation of the spring 320.

An advantage of the device having the sensor element 360 arranged in the device interior is that a load and/or movement of the spring 120 and/or corrugated hoses can be measured or detected without manual checking using external sensors. The measurement or detection result of the sensor element 360 can be transmitted by a radio link, for example, to an evaluation device (not shown). The evaluation device can evaluate and/or process the measurement results, store and/or compare them over a prolonged period of time and/or output them to an operator of the evaluation device. This facilitates the identification of non-optimally arranged housing devices or of an at least non-optimally constructed hose guide.

Figure 9:
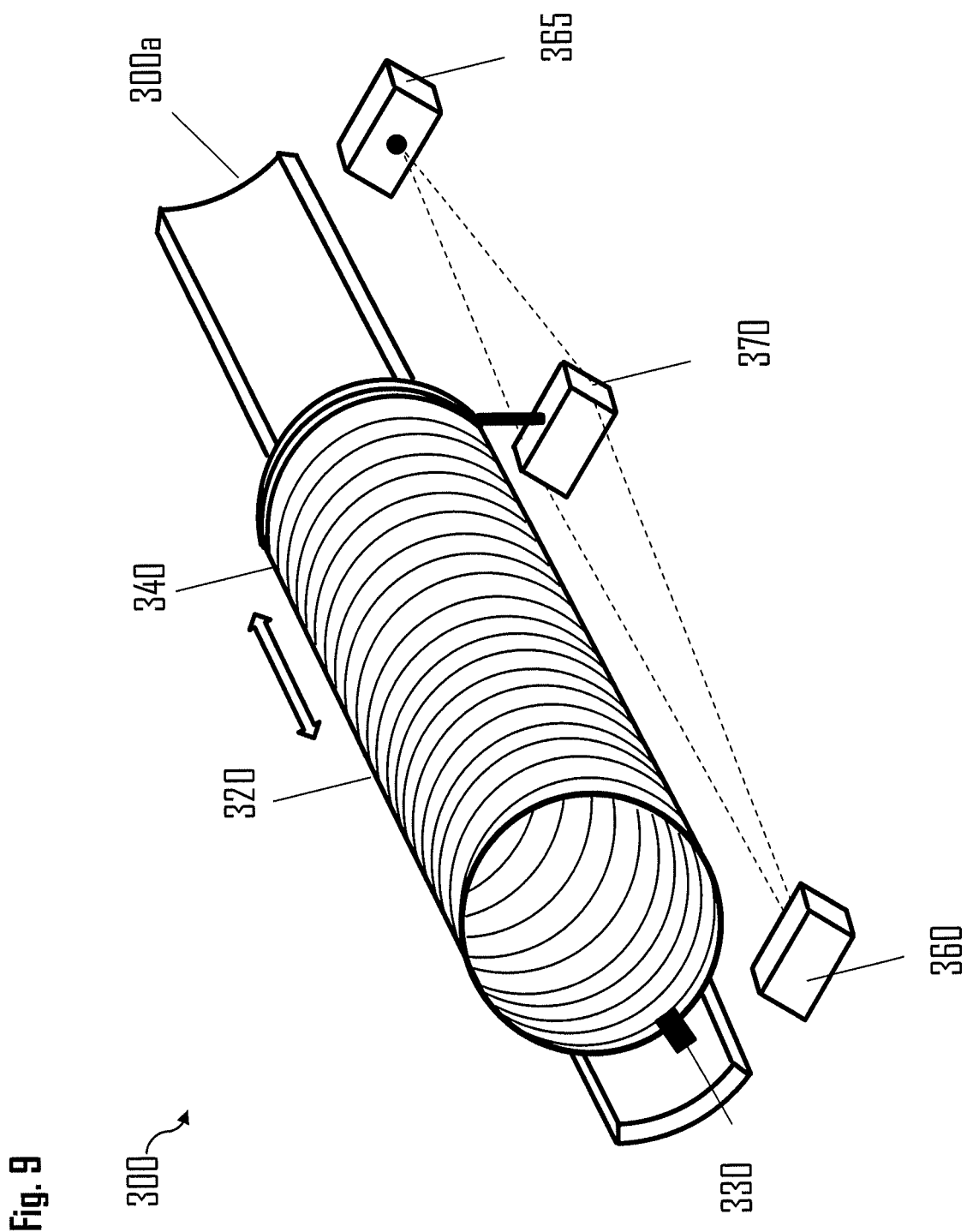
FIG. 9 shows, schematically, an example of a length compensating element which is arranged in a device interior of a device for housing corrugated hoses and which has a spring and two sensor elements for measuring a spring elongation.

A further development of the device 300 shown in FIG. 8 is shown in FIG. 9. In addition to the device elements shown in FIG. 8 and described hereinbefore, the further development shown in FIG. 9 has the additional sensor element 365, which is fastened to a further wall of the substantially cuboidal device interior portion 350 that is opposite the wall having the sensor element 360 fastened thereto. Analogously to the sensor element 360, the additional sensor element 365 also determines a distance between itself and the reflective element 370 by directing a beam of laser light onto a surface of the reflective element 370 and determining a distance or a spacing between itself and the reflective element 370 by means of a transit time measurement and/or by triangulation of the reflected beam of laser light.

Analogously to the sensor element 360, the additional sensor element 365 and/or the evaluation device (not shown), with which the additional sensor element 365 can also communicate via a radio link, can also determine a spring elongation or spring deflection of the spring 320 on the basis of the determined distance. Optionally, the sensor elements 360, 365, which in a further development (not shown) can also communicate with one another by means of a radio link, and/or the evaluation device can compare and average the determined values for the spring elongation or spring deflection in order to improve the accuracy of the values for the spring elongation or spring deflection.

As is shown in FIG. 9, the reflective element 370 can be arranged in particular in a space between the two sensor elements 360 and 365, wherein the sensor elements 360 and 365 can each illuminate or irradiate different, opposite surfaces of the reflective element 370 with a laser beam in order to determine a spring deflection or spring elongation of the spring 320.

In further developments of the devices shown here, the sensor elements 360 and/or 365 and/or the evaluation device (not shown) can be adapted to detect or determine on the basis of detected and/or recorded measurement data, for example by comparison with (pre-)stored target data, a spring fatigue that occurs over a period of use, canting of the spring in the device interior, deflection of a corrugated hose and/or a corrugated hose position or corrugated hose portion position. The sensor elements and/or the evaluation device can additionally be adapted to output an alarm and/or a warning message to a user or to a person responsible for maintenance of the device in the case of a deviation of the determined or detected parameters from a predetermined or stored target value range.

FIG. 10A shows, schematically, an example of the cooperation of a fastening element 500 having a toothing and a fastening device 510 having a corresponding counter-toothing.

The fastening element 500 can be part of a device for housing corrugated hoses (not shown) and in particular can be arranged on a housing element having a device interior. The fastening device 510 can be part of a machine, for example a robot, or of a building element and/or can be arranged on a machine, for example on a robot, or on a building element.

Both the fastening element 500 and the fastening device 510 have a toothing comprising a plurality of prism-shaped material projections which are formed identically to one another. In the example shown, the toothings of the fastening element 500 and of the fastening device 510 are configured identically to one another. The toothings of the fastening element 500 and of the fastening device 510 are additionally adapted to engage into one another and to be brought into an interlocking contact position for connecting the fastening element 510 and the fastening device 500. As is clear from FIG. 10, there are multiple different arrangement or fastening options for the arrangement of the fastening element on the fastening device. In particular, by displacing or moving the fastening element 500 in a longitudinal direction relative to the fastening device 510, an arrangement or fastening position of the fastening element 500 on the fastening device 510 can be varied. In an extreme case, the toothings of the fastening element 500 and of the fastening device 510 can be brought into contact with one another, for example, such that all the material projections of the fastening element 500 are in contact with at least one material projection of the fastening device 510. In another example, the toothings of the fastening element 500 and of the fastening device 510 can be brought into contact with one another such that only some of the material projections of the fastening element 500 are arranged in contact with at least one material projection of the fastening device 510. An arrangement or fastening position of the fastening element 500 on the fastening device 510 can thus be varied.

Figure 10:
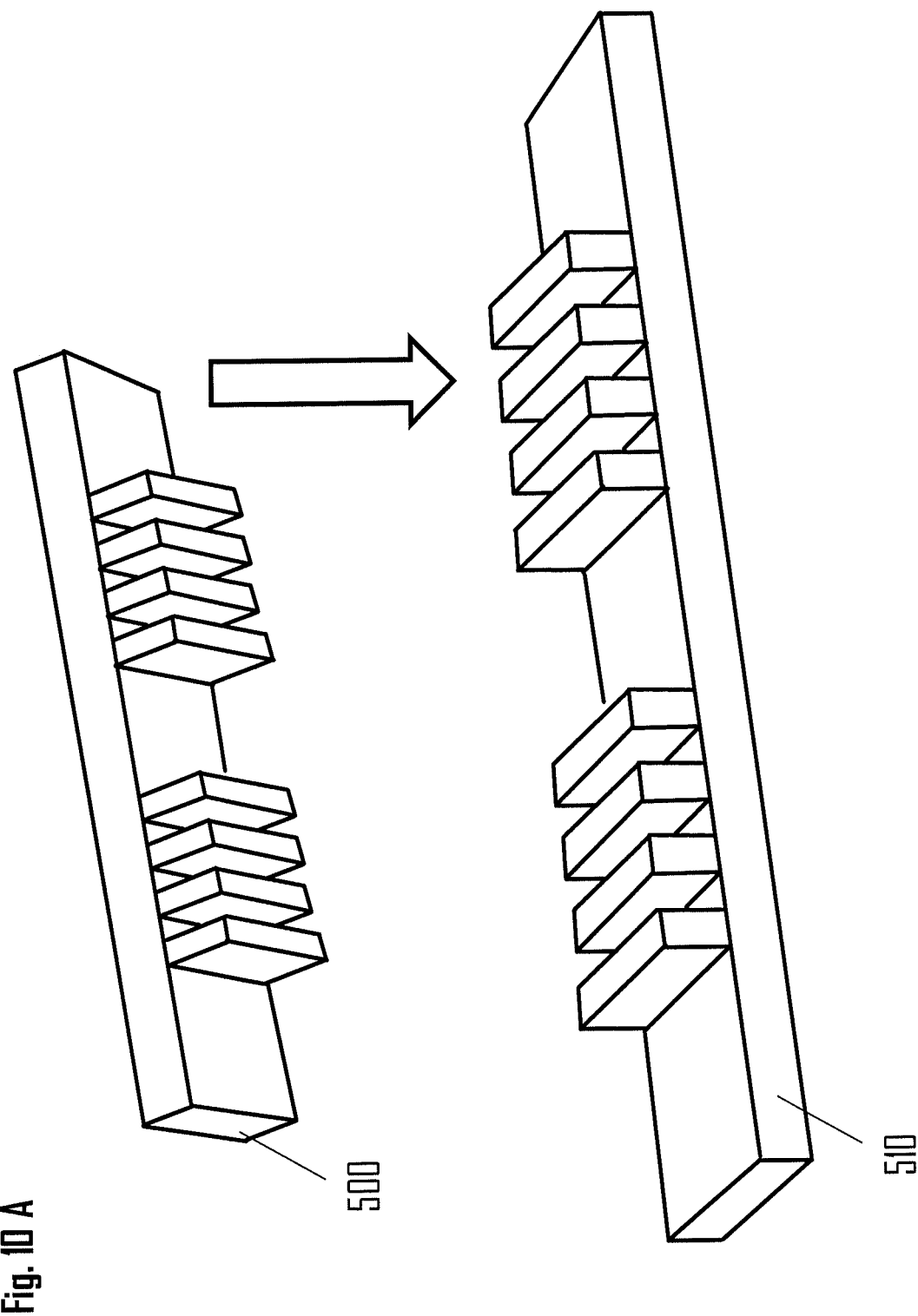
FIG. 10A/B show, schematically, an example of the cooperation of a fastening element having a toothing and a fastening device having a corresponding counter-toothing.
Figure 10:
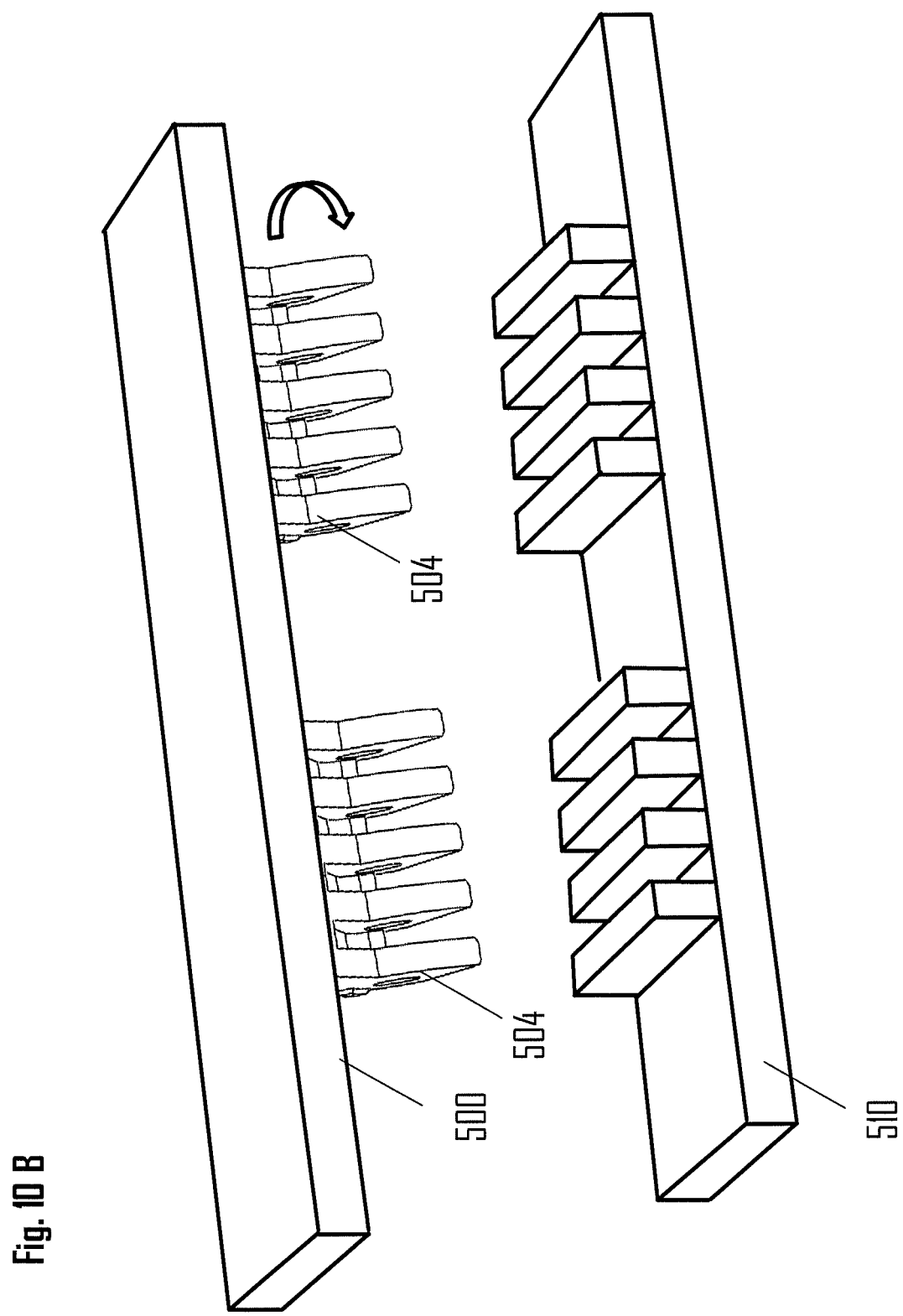

FIG. 10 B shows a further example of the cooperation of a fastening element 500 having a toothing and of a fastening device 510 having a corresponding counter-toothing 510.

The toothing of the fastening element 500 is arranged on a locking prolongation 504 of the fastening element 500. The locking prolongation 504 is pivotably arranged on a fastening element base body.

The toothing arranged on the locking prolongation 504 is adapted to be brought into interlocking engagement with at least part of the toothing of the fastening device 510 by pivoting of the locking prolongation 504 about a fastening element axis. By pivoting the locking prolongation 504 about the fastening element axis in the opposite direction, the toothing of the fastening element 500 can be detached from the toothing of the fastening device 510 again.

Figure 11:
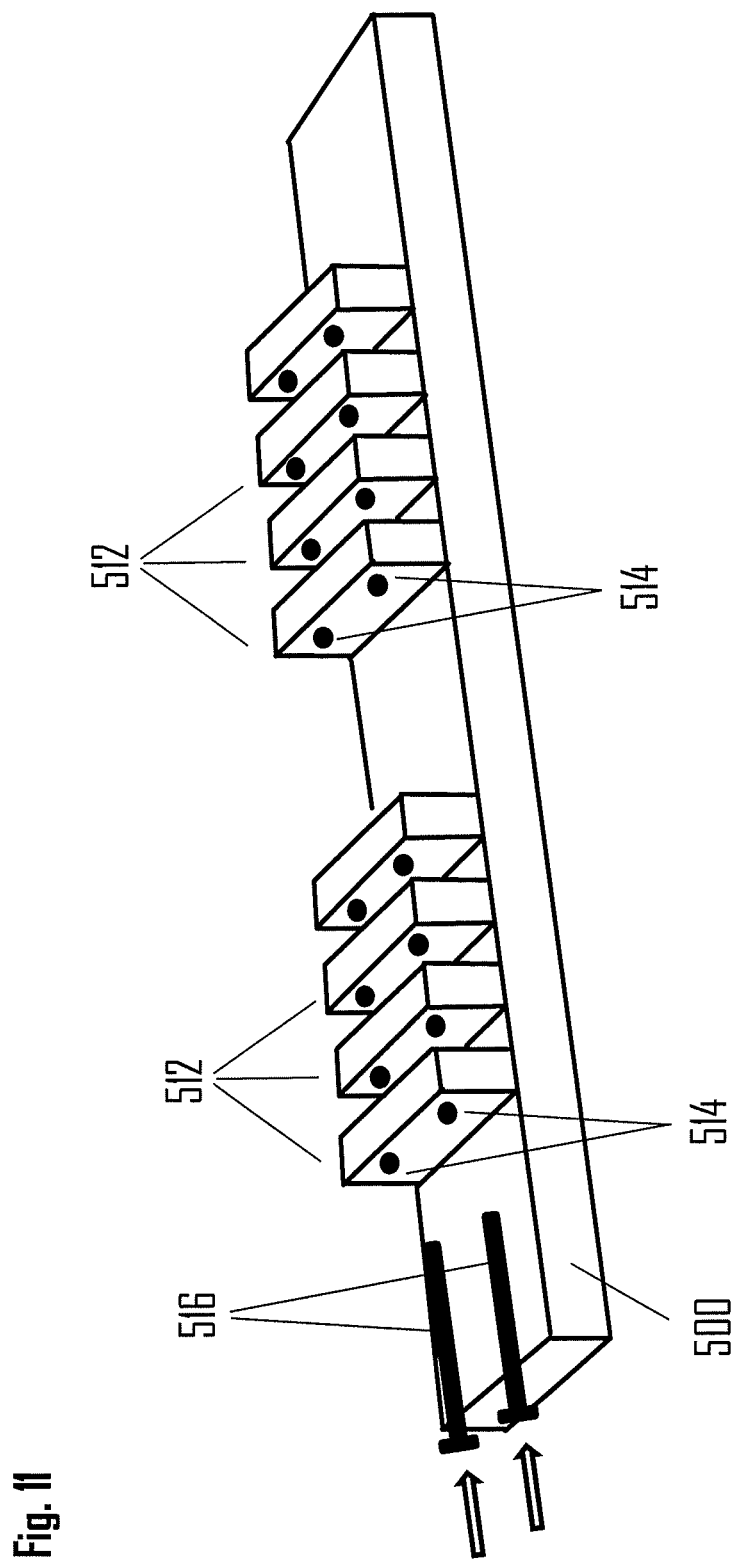
FIG. 11 shows, schematically, an example of a fastening element of a device for housing corrugated hoses.

FIG. 11 shows, schematically, a further example of a fastening element 500 of a device for housing corrugated hoses. Although, for reasons of clarity, FIG. 11 shows only the fastening element 500 fastened to a housing element of a device, it is clear that a fastening device (not shown here) corresponding to the fastening element 500 shown can have features corresponding to each of the features shown in FIG. 11.

As is shown in FIG. 11, the prism-shaped material projections 512 which form the toothing of the fastening element 500 shown can each have a plurality of prepared material cutouts or openings 514 which are configured to cooperate with the fastening bolts 516 shown. In other words, the material cutouts or openings 514 are each configured to receive a fastening bolt 516.

If the fastening element 500 shown in FIG. 11 is arranged at least partially in an interlocking manner on a fastening device 510, wherein the toothing and/or the material projections of the fastening device 510 each have material cutouts or openings which correspond to the toothing and/or to the material projections of the fastening element 500 and which are each configured to receive a fastening bolt 516, the fastening element 500 can be detachably fastened to the fastening device 510 by means of the fastening bolts 516.

In other words, the fastening element 500 and the fastening device 510 can be arranged at least partially in interlocking contact with one another, wherein at least part of the toothing of the fastening element 500 engages into at least part of the toothing of the fastening device 510. The at least partial interlocking contact of the fastening element 500 with the fastening device 510 can then be fixed and/or improved in that the fastening bolts 516 are arranged in the openings of the material projections of the fastening element 500 and of the fastening device 510, so that they prevent the fastening element 500 from being detached from the fastening device 510.

In some embodiments (not shown), the fastening bolts can have latching pawls or latching prolongations which in particular are at least partially resiliently deformable and can serve to establish or ensure fixing or fastening of the fastening bolts in the material cutouts or openings of the material projections. The fastening bolts can be both inserted into the openings of the material projections by a user or installer of the device without an additional tool and removed from the openings of the material projections again by a user or installer of the device without an additional tool. The arrangement of the device for housing corrugated hoses on a fastening device can thus be carried out quickly and efficiently.

Figure 12:
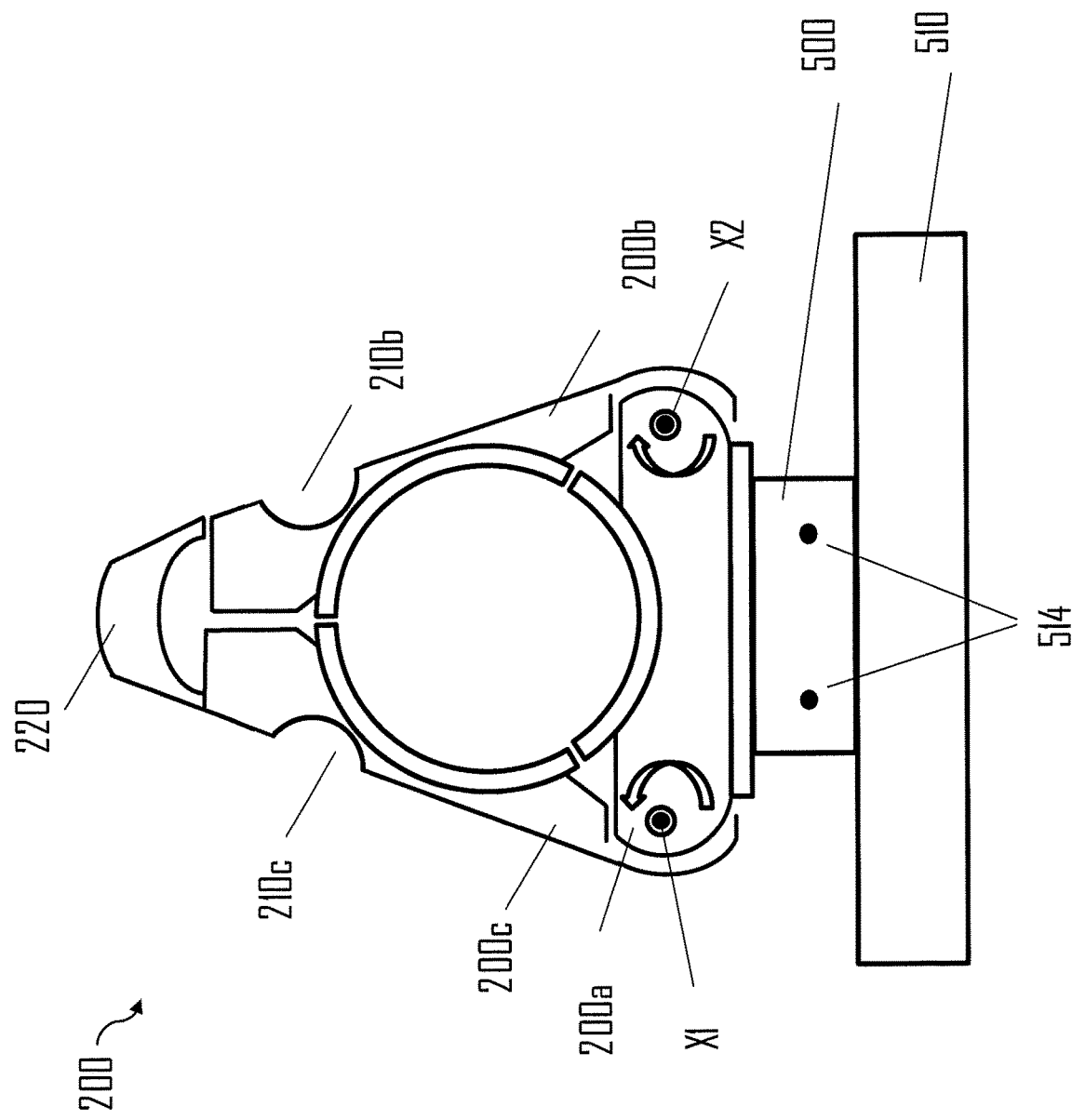
FIG. 12 shows, schematically, an example of a device for housing corrugated hoses having a fastening element, wherein the device is arranged by the fastening element on a fastening device, in a sectional representation.

An example of such a device for housing corrugated hoses having a fastening element 500 which is fastened to a fastening device 510 is shown, for example, in FIG. 12. As is shown by FIG. 12 in a sectional representation, a device for housing corrugated hoses can have, for example, a housing element 200 having a plurality of shell elements 200a, 200b, 200c, and a fastening element 500 arranged on one of the shell elements. The device having the fastening element 500 can be arranged on the fastening device 510 shown in a sectional representation. Optionally, the fastening bolts 516 (not shown in FIG. 12) can be inserted into the openings 514 shown in order to prevent the fastening element 500 from being detached from the fastening device 510.

Figure 13:
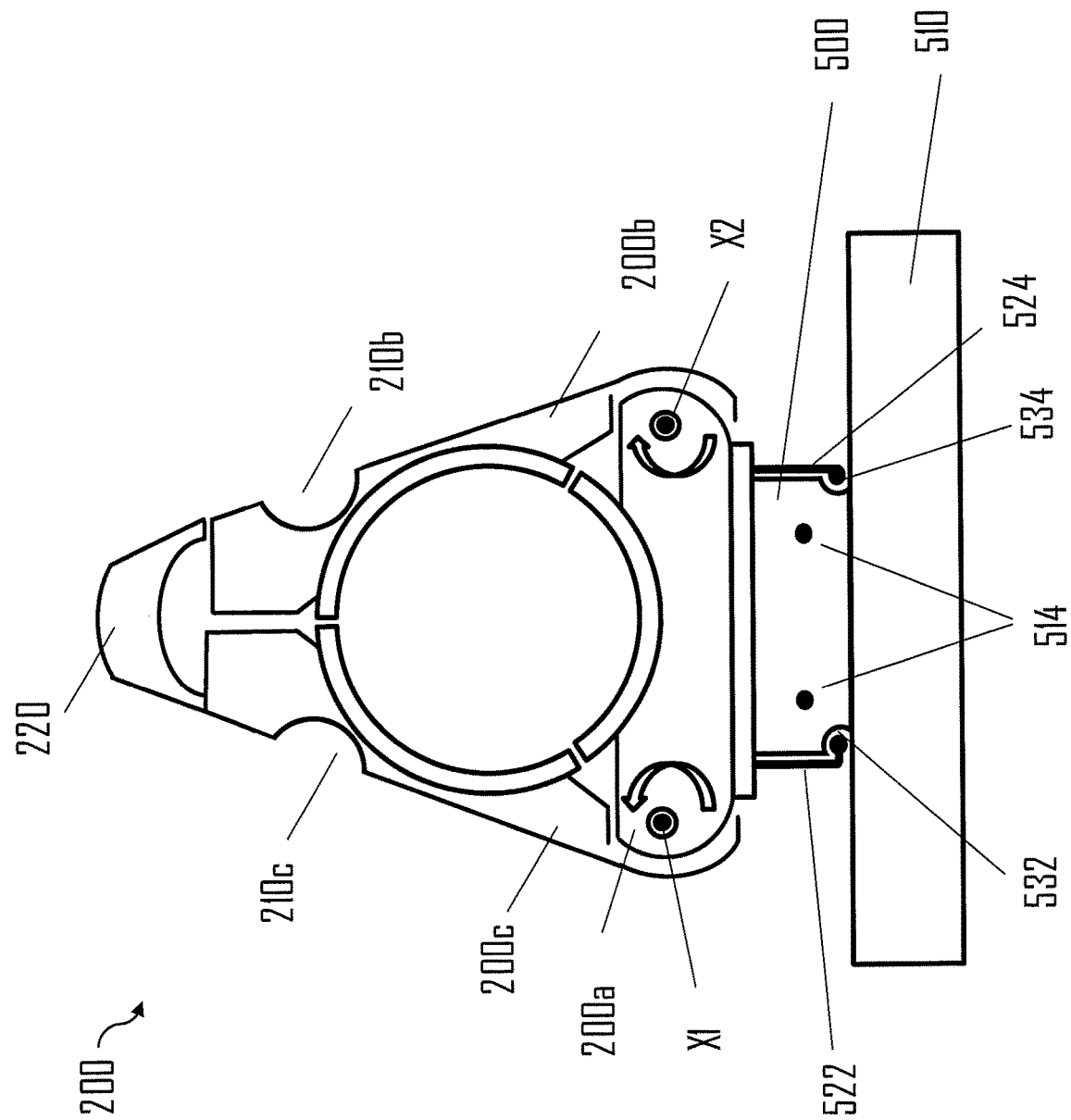
FIG. 13 shows, schematically, an example of a device for housing corrugated hoses having a fastening element which comprises a first and a second latching element, wherein the device is arranged by the fastening element on a fastening device, in a sectional representation.

Alternatively or in addition to the fastening bolts 516, the fastening element 500, as is shown in FIG. 13, can further have a first at least partially resiliently deformable latching element 522 which is arranged and configured to be arranged in a first undercut 532 in a first side face of a fastening device 510. A side face of a fastening device 510 can of course also be the side face of a toothing of the fastening device 510. In addition, the device shown in FIG. 13 has a second at least partially resiliently deformable latching element 524 which is arranged and configured to be arranged in a second undercut 534 in a second side face of the fastening device located opposite the first side face.

The first and the second latching element 522, 524 are formed asymmetrically to one another. In the exemplary embodiment shown in FIG. 13, the first and the second at least partially resiliently deformable latching element 522, 524 are each designed with an at least partially resiliently deformable wall which in each case has a material projection. The material projection of the first deformable latching element 522 here protrudes further or higher from the at least partially resiliently deformable wall of the latching element 522 than does the material projection of the second resiliently deformable latching element 524 from its at least partially resiliently deformable wall. The undercuts 532 and 534 in the side faces of the fastening device 510 are formed correspondingly thereto. In one embodiment (not shown), the toothing of the fastening element 500 can also have cutouts corresponding to the undercuts 532, 534 in the side faces of the fastening device.

An advantage of the mutually asymmetrical latching elements is that the fastening element can be arranged on and fastened to the fastening device in a simple manner and without an additional tool, in particular by a rotational movement, but unintentional detachment of the fastening element from the fastening device is considerably more difficult. Owing to the asymmetrical configuration of the latching elements 522, 524, detachment of the fastening element from the fastening device requires an at least partial tilting and pulling movement, which at least only rarely is performed unintentionally by a user of the device or occurs as a result of a collision of the device with other machine parts.

Figure 14:
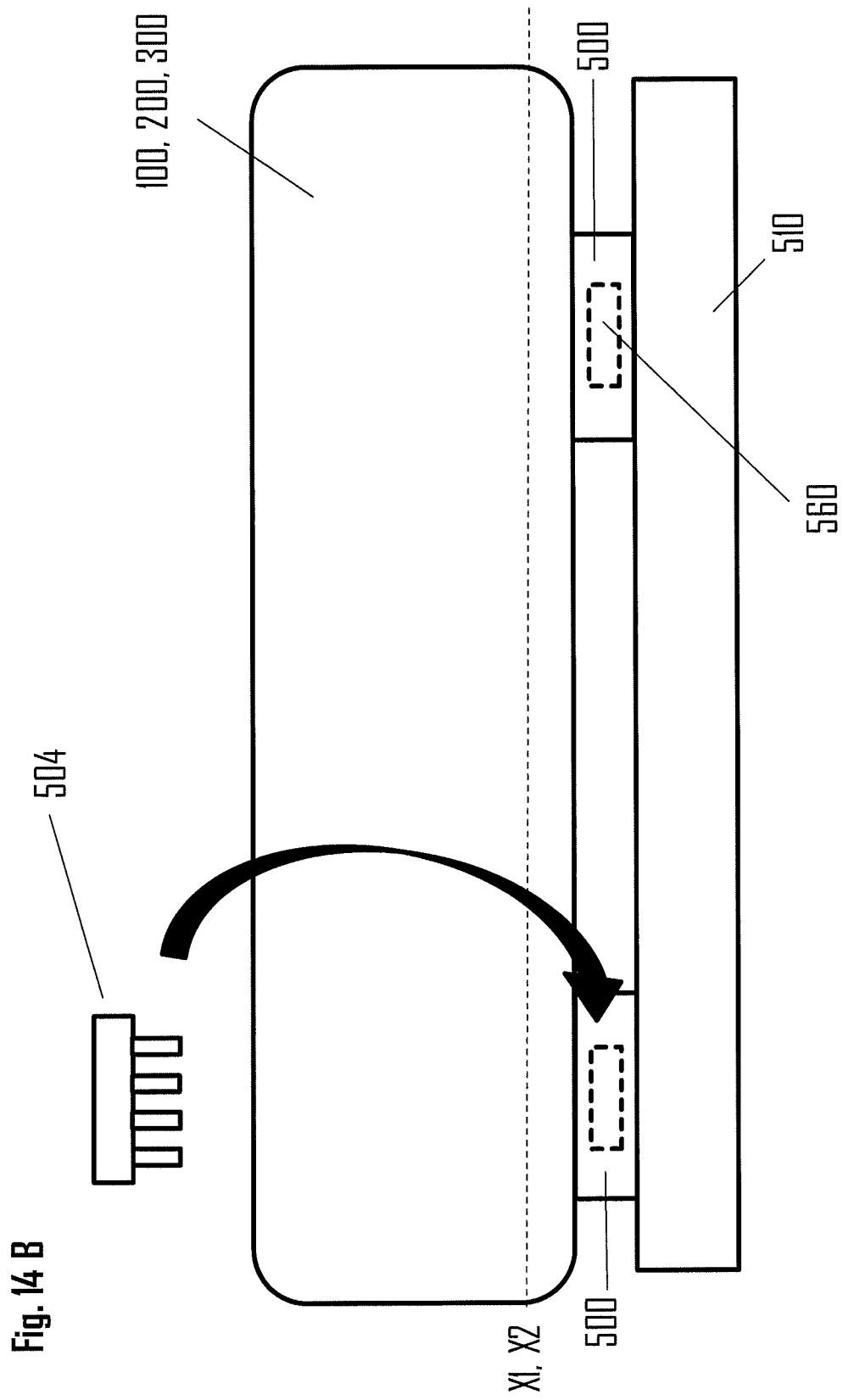
FIG. 14A-C show, schematically, examples of a device for housing corrugated hoses having a fastening element, wherein the device is arranged by the fastening element on a fastening device and is fixed by fastening clips or locking prolongations, in a sectional representation.
Figure 14:
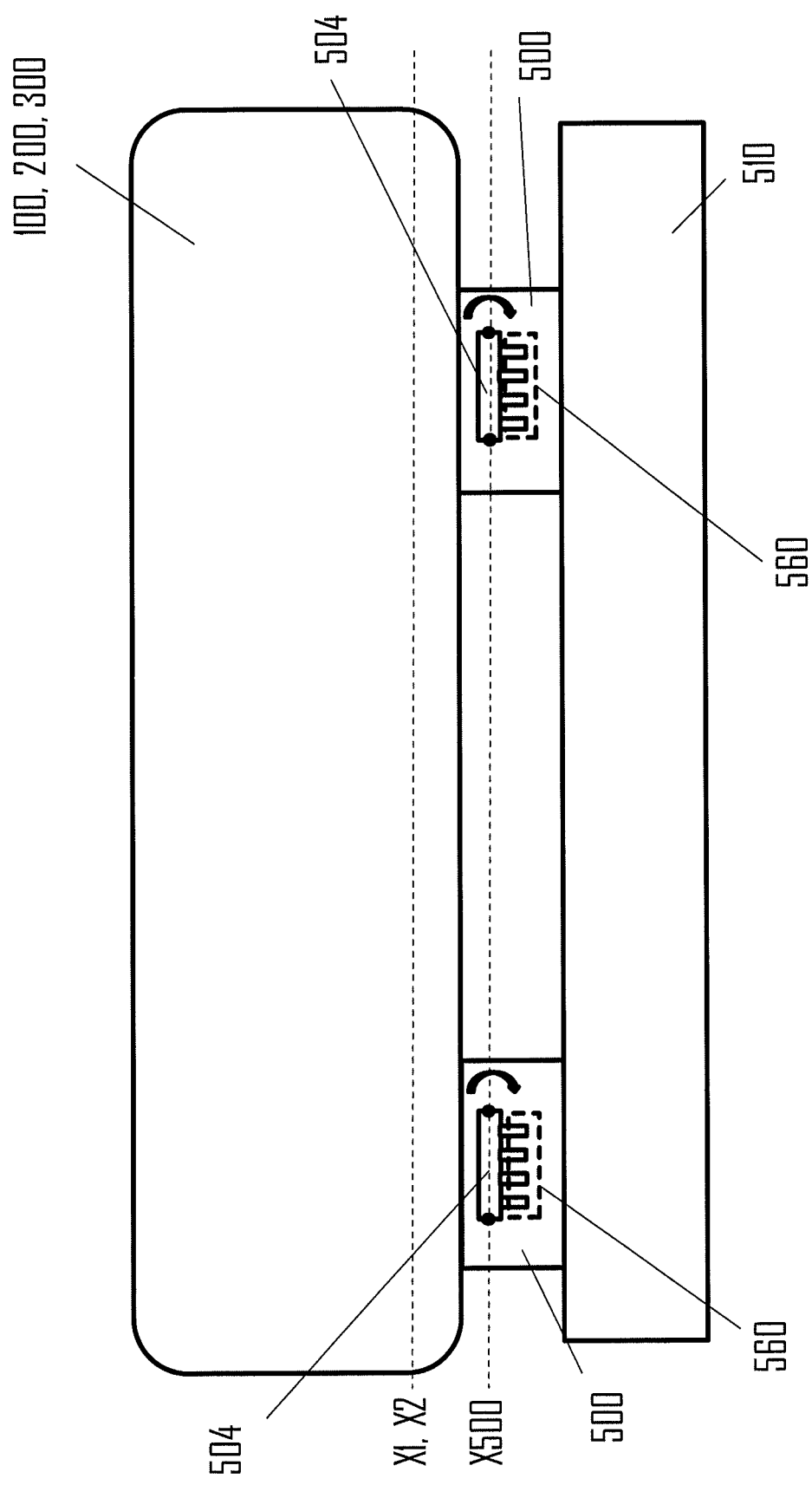

Alternatively or in addition to the fastening bolts 516 and/or the at least partially resiliently deformable latching elements 522, 524, the fastening element 500 can also be fixed to the fastening device 510 by fastening clips 570, which are introduced into the fastening element 500 and into the fastening device 510 in a direction transverse to the rotational axes X1 and/or X2. FIG. 14 shows, schematically, an example of a device for housing corrugated hoses having a fastening element 500, wherein the device is arranged on a fastening device 510 by the fastening element 500 and is fixed by fastening clips 570, in a sectional representation.

As is shown schematically in FIG. 14A, the fastening element 500, the toothing of the fastening element 500 and/or the toothing of the fastening device 510 can have lateral cutouts which, when the fastening element is arranged on the fastening device, can together form a receiving opening 560, for example for a fastening clip 570.

The fastening clip 570 can be inserted laterally into the fastening element 500 and into the fastening device 510. In particular, as is shown in FIG. 14A, the toothings of the fastening element 500 and of the fastening device 510 can have cutouts which in conjunction, that is to say after the fastening element 500 has been arranged on the fastening device 510, at least partly form or shape a receiving opening 560 for a fastening clip 570. In addition, the receiving opening 560 can also be introduced (concomitantly) into a side face or wall of the fastening element 500 or of the fastening device 510. For example, the receiving opening 560 can also be arranged in an at least partially resiliently deformable wall of at least one of the latching elements 522, 524.

The fastening clip(s) 570 is/are at least partially resiliently deformable and/or has/have at least partially resiliently deformable material portions and/or at least partially resiliently deformable structural elements. Furthermore, the fastening clip(s) 570 is/are configured to be arranged and/or positioned, in particular laterally, in one of the receiving openings 560 such that it/they prevent(s) the fastening element 500 from being detached from the fastening device 510. A fastening clip 570 can both be inserted into a receiving opening 560 by a user or installer of the device without an additional tool and removed from the receiving opening 560 again by a user or installer of the device without an additional tool. The arrangement of the device for housing corrugated hoses on a fastening device can thus be carried out quickly and efficiently.

Furthermore, FIGS. 14B and 14C show, schematically, that the receiving opening 560 of the fastening element 500 can also be adapted to receive the locking prolongation 504 of the fastening element 500. As described, the locking prolongation 504 can have the toothing of the fastening element 500. By arranging the locking prolongation 504 in the receiving opening 560 of the fastening element 500, the toothing of the fastening element 500 can be brought into engagement and/or into contact with the toothing of the fastening device 510.

As is shown schematically in FIG. 14C, the locking prolongation 504 can be arranged on the fastening element 500 such that it can be introduced into the receiving opening 560 by a pivoting movement about the fastening element axis X500, which can be arranged parallel to the rotational axes X1 and X2. The toothing of the fastening element 500 can thus be brought into engagement and/or into contact with the toothing of the fastening device 510. In other words, the locking prolongation 504 can be pivotably arranged on a different part of the fastening element 500, wherein the toothing arranged on the locking prolongation 504 can be brought into engagement and/or into contact with the toothing of the fastening device 510.

Optionally, the locking prolongation 504 can have a resiliently deformable locking prolongation latching element (not shown) which is configured, for example, analogously to the fastening clip 570 shown in FIG. 14A and is adapted to fix the locking prolongation 504 in the receiving opening 560 once the toothing of the fastening element 500 and the toothing of the fastening device 510 have been brought into engagement with one another.

It will be appreciated that the exemplary embodiments explained above are not exhaustive and do not limit the subject-matter disclosed herein. In particular, it will be clear to the person skilled in the art that he can combine the described features with one another in any desired manner and/or can omit various features without departing from the subject-matter disclosed herein.

The invention claimed is:

1. Device for housing cable guides, including corrugated hoses, comprising:
    a housing element having a plurality of shell elements which are adapted together to at least partially enclose a device interior having at least two device openings,
    at least one fastening element which is arranged on the housing element and is configured to be detachably arranged on a fastening device,
    wherein each of the plurality of shell elements is arranged on at least one further shell element so as to be pivotable about a rotational axis.

2. Device according to claim 1, further having
    a closing device which is arranged on one shell element or on a plurality of shell elements and is configured to detachably fasten at least two of the plurality of shell elements together, wherein
    the closing device has at least one locking element which is displaceable in a direction parallel to the rotational axis/axes and which is adapted to produce and/or to release the detachable fastening.

3. Device according to claim 2, wherein
    the closing device has at least one closure bar which is arranged on at least one of the pivotable shell elements, wherein
    the closure bar has at least in some portions an at least partially T-shaped cross section, and/or
    the closure bar is adapted to be brought into contact, by interlocking engagement, at least in some portions with part of a further shell element, and/or to form together with the part of the further shell element at least in some portions an at least partially T-shaped cross section, and/or
    the locking element is adapted to be brought into contact, by interlocking engagement, at least in some portions with the closure bar.

4. Device according to claim 3, wherein the closure bar and/or one of the shell elements has one or more latching projections which are adapted to detachably fix the displaceable locking element in a predetermined position and/or to provide a pressure resistance against a displacement or movement of the locking element in a direction parallel to the rotational axis/axes.

5. Device according to claim 4, wherein the latching projections are adapted to detachably fix the displaceable locking element in three different predetermined positions and/or to provide a pressure resistance against a displacement or movement of the locking element in a direction parallel to the rotational axis/axes when the locking element is moved out of one of the three predetermined positions.

6. Device according to claim 2, wherein
    the locking element has handling grooves running in a direction substantially orthogonal to the rotational axis/axes, and/or
    the locking element is adapted to be brought into interlocking contact with a central element when the closing device detachably fastens at least two of the plurality of shell elements together.

7. Device according to claim 1, wherein one or more of the shell elements has at a device opening, a guide geometry which is formed into the interior and which is suitable for defining and/or influencing and/or maintaining a positioning of a cable guide or corrugated hose.

8. Device according to claim 1, further having
    at least one length compensating element arranged in the device interior and having at least one spring which is fixed to one of the shell elements and/or to a guide geometry and has a cable guide or corrugated hose housing, wherein the cable guide or corrugated hose housing is adapted to be arranged on a cable guide or on a corrugated hose, wherein the length compensating element having the at least one spring is adapted to house a cable guide including a corrugated hose, arranged on the cable guide or corrugated hose housing, with a material tension in a direction parallel to the rotational axis/axes.

9. Device according to claim 1, wherein one, a plurality and/or all of the shell elements have an indentation, bead or groove on an outer side of the shell elements, wherein the shell elements are adapted to lie with an inner side opposite the outer side against a cable guide including a corrugated hose, housed by the housing element, and/or against the length compensating element.

10. Device according to claim 1, further having at least one rotation element about which at least two of the shell elements are mounted so as to be pivotable about a rotational axis, wherein the two shell elements which are mounted so as to be pivotable about the rotation element enclose the rotation element completely.

11. Device according to claim 1, wherein the device interior enclosed by the shell elements has an at least substantially cylindrical portion which is configured to house the length compensating element and/or at least part of a cable guide or of a corrugated hose and/or a guide geometry, and/or the device interior enclosed by the shell elements has an at least substantially cuboidal portion which is adapted to house one or more sensor elements.

12. Device according to claim 8, further having at least one sensor element which is adapted to detect a spring elongation of the spring of the length compensating element, and/or wherein the at least one sensor element is an optically detecting sensor element.

13. Device according to claim 1, wherein the fastening element is adapted to be arranged on the fastening device by a screw connection, and/or the fastening element has a toothing and is adapted to engage by means of the toothing in an interlocking manner into a toothing of the fastening device.

14. Device according to claim 13, wherein the fastening element is adapted to be detachably fastened to the fastening device by fastening bolts and/or by fastening clips, wherein the fastening bolts and/or the fastening clips each engage both into prepared openings in the fastening element and into prepared openings in the fastening device, and wherein the fastening bolts and/or the fastening clips can each be inserted into the prepared openings in the fastening element and into the prepared openings in the fastening device in a direction parallel to the rotational axis/axes or in a direction orthogonal to the rotational axis/axes.

15. Device according to claim 1, further having one or more sealing elements which are each arranged at one of the device openings and are adapted to lie against an at least partially housed cable guide-against an at least partially housed corrugated hose, wherein the sealing elements are each adapted to close the device opening in an at least substantially dust and/or liquid-tight manner in conjunction with the housed cable guide or with the housed corrugated hose.

* * * * *